(12) United States Patent
Samal et al.

(10) Patent No.: US 11,727,085 B2
(45) Date of Patent: Aug. 15, 2023

(54) DEVICE, METHOD, AND COMPUTER PROGRAM FOR PERFORMING ACTIONS ON IOT DEVICES

(71) Applicant: SAMSUNG ELECTRONICS CO., LTD., Suwon-si (KR)

(72) Inventors: Siba Prasad Samal, Bangalore (IN); Niranjan B Patil, Bangalore (IN); Ravi Nanjundappa, Bangalore (IN); Om Prakash, Bangalore (IN); Mahesha N, Bengaluru (IN); Ankit Jain, Delhi (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/223,757

(22) Filed: Apr. 6, 2021

(65) Prior Publication Data

US 2021/0313079 A1     Oct. 7, 2021

(30) Foreign Application Priority Data

Apr. 6, 2020   (IN) .............................. 202041015159

(51) Int. Cl.
*G06F 17/18*     (2006.01)
*G16Y 40/30*     (2020.01)
*G06F 3/16*      (2006.01)

(52) U.S. Cl.
CPC .............. *G06F 17/18* (2013.01); *G06F 3/167* (2013.01); *G16Y 40/30* (2020.01)

(58) Field of Classification Search
CPC .......... G16Y 40/30; G06F 3/167; G06F 17/18
See application file for complete search history.

(56) References Cited

U.S. PATENT DOCUMENTS 9,722,811 B2      8/2017  Ko et al.
2008/0183685 A1*  7/2008  He .................... G06F 16/24575
(Continued)

FOREIGN PATENT DOCUMENTS

WO      2019/082630 A1    5/2019

OTHER PUBLICATIONS

International Search Report (PCT/ISA/210) and Written Opinion (PCT/ISA/237) dated Jul. 21, 2021 issued by the International Searching Authority in International Application No. PCT/KR2021/004268.

(Continued)

*Primary Examiner* — Emmanuel L Moise
*Assistant Examiner* — Xiang Yu
(74) *Attorney, Agent, or Firm* — Sughrue Mion, PLLC

(57) ABSTRACT

A method of controlling an Internet of Things (IoT) device to perform an action, is performed by an electronic device and includes obtaining at least one input from a user, based on a predefined action corresponding to the obtained at least one input being not identifiable, transmitting the obtained at least one input to a server, receiving, from the server, information regarding at least one activity that is mapped to at least one IoT device that is identified based on the transmitted at least one input, and information regarding at least one object and/or at least one context, and identifying an action to be performed on an IoT device among the at least one IoT device, based on a correlation between the obtained at least one input and the at least one activity mapped to the at least one IoT device.

17 Claims, 13 Drawing Sheets

(56) References Cited

U.S. PATENT DOCUMENTS

| | | | |
|---|---|---|---|
| 2009/0018830 A1* | 1/2009 | Emmanuel | G10L 15/26 |
| | | | 704/235 |
| 2013/0238326 A1 | 9/2013 | Kim et al. | |
| 2016/0217124 A1 | 7/2016 | Sarikaya et al. | |
| 2017/0140041 A1 | 5/2017 | Dotan-Cohen et al. | |
| 2017/0345420 A1* | 11/2017 | Barnett, Jr. | G10L 15/1815 |
| 2018/0286396 A1 | 10/2018 | Yao et al. | |
| 2018/0308490 A1 | 10/2018 | Lim et al. | |
| 2018/0350350 A1* | 12/2018 | Robinson | G10L 15/063 |
| 2019/0324621 A1* | 10/2019 | Maiya | G06F 3/041 |
| 2020/0020334 A1* | 1/2020 | Kang | G06F 3/167 |
| 2020/0035239 A1 | 1/2020 | Ni et al. | |
| 2020/0258503 A1 | 8/2020 | Maeda | |
| 2020/0285069 A1* | 9/2020 | Villalpando | G06F 3/167 |
| 2020/0327442 A1* | 10/2020 | Mcnamara | G06K 9/628 |
| 2020/0357395 A1* | 11/2020 | Mirelmann | G06F 3/167 |
| 2020/0365151 A1* | 11/2020 | Jo | G10L 15/22 |
| 2021/0168044 A1* | 6/2021 | Ogawa | H04L 67/564 |

OTHER PUBLICATIONS

Ravi, S., et al., "Self-Governing Neural Networks for On-Device Short Text Classification", Proceedings of the 2018 Conference on Empirical Methods in Natural Language Processing, Nov. 4, 2018, pp. 887-893.

Joulin, A., et al., "Bag of Tricks for Efficient Text Classification", arXiv:1607.01759v3 [cs.CL] Aug. 9, 2016, 5 pages.

Bojanowski, P., et al., "Enriching Word Vectors with Subword Information" arXiv:1607.04606v2 [cs.CL] Jun. 19, 2017, 12 pages.

* cited by examiner

DEVICE, METHOD, AND COMPUTER PROGRAM FOR PERFORMING ACTIONS ON IOT DEVICES

CROSS-REFERENCE TO RELATED APPLICATION(S)

This application is based on and claims priority under 35 U.S.C. § 119 to Indian Patent Application No. 202041015159, filed on Apr. 6, 2020, in the Indian Patent Office, the disclosure of which is incorporated by reference herein in its entirety.

BACKGROUND

1. Field

The disclosure relates to a field of an electronic device, specifically, to devices, methods, and computer programs for performing actions on IoT devices.

2. Description of Related Art

With the advancement in technology, various electronic devices, such as smartphones and televisions, may be provided with voice assisted function that can be accessed through a voice command. Nowadays, users may be more inclined towards using such voice assisted devices in office premises, smart home environments, and other similar locations. Such voice assisted devices can usually perform tasks based on voice command from one or more users. However, current voice assisted devices support only a predefined set of commands to execute actions in the environment. For instance, if the user fails to provide a command from among the predefined set of commands, then the voice assisted device may fail to recognize such a command and instruct the user to re-utter the command. This may be a cumbersome task for the user, and may lead to increase in cognitive load on the user to remember each of the predefined set of commands.

SUMMARY

Additional aspects will be set forth in part in the description that follows and, in part, will be apparent from the description, or may be learned by practice of presented embodiments.

In accordance with an aspect of the disclosure, there is provided a method of controlling an Internet of Things (IoT) device to perform an action, the method being performed by an electronic device, and the method including obtaining at least one input from a user, and based on a predefined action corresponding to the obtained at least one input being not identifiable, transmitting the obtained at least one input to a server. The method further includes receiving, from the server, information regarding at least one activity that is mapped to at least one IoT device that is identified based on the transmitted at least one input, and information regarding at least one object and/or at least one context, wherein the at least one object and/or the at least one context is identified based on the obtained at least one input and characteristic information of the user. The method further includes identifying an action to be performed on an IoT device among the at least one IoT device, based on a correlation between the obtained at least one input and the at least one activity mapped to the at least one IoT device, and transmitting an instruction for performing the identified action, to the IoT device among the at least one IoT device.

The receiving may include receiving, from the server, probability information regarding at least one candidate action for the at least one activity mapped to the at least one IoT device, and the probability information may indicate a likelihood that each of the at least one candidate action corresponds to the obtained at least one input.

The method may further include identifying user actions that are performed subsequent to the obtained at least one input, and obtaining similarity information indicating similarity between each of the identified user actions and the obtained at least one input. The identifying of the action may include identifying the action to be performed on the IoT device among the at least one IoT device, based on the obtained similarity information and the received probability information.

The obtaining of the similarity information may include classifying the identified user actions in predetermined categories, based on the obtained at least one input, and obtaining, based on the categories in which the user actions are classified, a similarity score for each of the user actions, as the similarity information.

The at least one activity and the at least one IoT device may be mapped based on any one or any combination of a plurality of pre-trained regression functions, at the server, and each of the plurality of pre-trained regression functions may be identified according to an activity and an IoT device.

The method may further include updating a database, based on the identified action that is mapped to the obtained at least one input, and based on receiving another input corresponding to the obtained at least one input, after the database is updated, transmitting, to the IoT device, the instruction for performing the identified action.

In accordance with an aspect of the disclosure, there is provided a method of controlling an Internet of Things (IoT) device to perform an action, the method being performed by a server, and the method including receiving, from an electronic device, at least one input of a user, based on a predefined action corresponding to the at least one input being not identifiable at the electronic device, and identifying at least one object and/or at least one context, based on characteristic information of the user and the received at least one input. The method further includes identifying at least one activity that is mapped to at least one IoT device, based on the received at least one input and the identified at least one object and/or the identified at least one context, and transmitting, to the electronic device, information regarding the identified at least one activity mapped to the at least one IoT device, and information regarding the identified at least one object and/or the identified at least one context. An action to be performed on an IoT device among the at least one IoT device may be identified at the electronic device, based on a correlation between the at least one input and the at least one activity mapped to the at least one IoT device.

The identifying of the at least one activity mapped to the at least one IoT device may include obtaining probability information regarding at least one candidate action for the at least one activity mapped to the at least one IoT device, and the probability information may indicate a likelihood that each of the at least one candidate action corresponds to the received at least one input.

User actions that are performed subsequent to the received at least one input may be identified at the electronic device, and the action to be performed on the IoT device among the at least one IoT device may be identified at the electronic device, based on the probability information and similarity information indicating similarity between each of the identified user actions and the at least one input.

The identifying of the at least one activity mapped to the at least one IoT device may include mapping the at least one activity to the at least one IoT device, based on any one or any combination of a plurality of pre-trained regression functions, and each of the plurality of pre-trained regression functions may be identified according to an activity and an IoT device.

In accordance with an aspect of the disclosure, there is provided an electronic device for controlling an Internet of Things (IoT) device to perform an action, the electronic device including a memory storing one or more instructions, a communication interface, and a processor configured to execute the one or more instructions stored in the memory to obtain at least one input from a user, based on a predefined action corresponding to the obtained at least one input being not identifiable, transmit, via the communication interface, the obtained at least one input to a server, and receive, from the server via the communication interface, information regarding at least one activity that is mapped to at least one IoT device that is identified based on the transmitted at least one input, and information regarding at least one object and/or at least one context, wherein the at least one object and/or the at least one context is identified based on the obtained at least one input and characteristic information of the user. The processor is further configured to identify an action to be performed on IoT device among the at least one IoT device, based on a correlation between the obtained at least one input and the at least one activity mapped to the at least one IoT device, and transmit, via the communication interface, an instruction for performing the identified action, to the IoT device among the at least one IoT device.

The processor may be further configured to receive, from the server via the communication interface, probability information regarding at least one candidate action for the at least one activity mapped to the at least one IoT device, and the probability information may indicate a likelihood that each of the at least one candidate action corresponds to the obtained at least one input.

The processor may be further configured to identify user actions that are performed subsequent to the obtained at least one input, obtain similarity information indicating similarity between each of the identified user actions and the obtained at least one input, and identify the action to be performed on the IoT device among the at least one IoT device, based on the obtained similarity information and the received probability information.

The processor may be further configured to classify the identified user actions in predetermined categories, based on the obtained at least one input, and obtain, based on the categories in which the user actions are classified, a similarity score for each of the user actions, as the similarity information.

The at least one activity and the at least one IoT device may be mapped based on any one or any combination of a plurality of pre-trained regression functions, at the server, and each of the plurality of pre-trained regression functions is identified according to an activity and an IoT device.

The processor may be further configured to update a database, based on the identified action that is mapped to the obtained at least one input, and based on receiving another input corresponding to the obtained at least one input, after the database is updated, transmit, to the IoT device via the communication interface, the instruction for performing the identified action.

In accordance with an aspect of the disclosure, there is provided a server for controlling an Internet of Things (IoT) device to perform an action, the server including a memory storing one or more instructions, a communication interface, and a processor configured to execute the one or more instructions stored in the memory to receive, from an electronic device via the communication interface, at least one input of a user, based on a predefined action corresponding to the at least one input being not identifiable at the electronic device, identify at least one object and/or at least one context, based on characteristic information of the user and the received at least one input, identify at least one activity that is mapped to at least one IoT device, based on the received at least one input and the identified at least one object and/or the identified at least one context, and transmit, to the electronic device via the communication interface, information regarding the identified at least one activity mapped to the at least one IoT device, and information regarding the identified at least one object and/or the identified at least one context. An action to be performed on an IoT device among the at least one IoT device is identified at the electronic device, based on a correlation between the at least one input and the at least one activity mapped to the at least one IoT device.

The processor may be further configured to obtain probability information regarding at least one candidate action for the at least one activity mapped to the at least one IoT device, and the probability information may indicate a likelihood that each of the at least one candidate action corresponds to the received at least one input.

User actions that are performed subsequent to the received at least one input may be identified at the electronic device, and the action to be performed on the IoT device among the at least one IoT device may be identified at the electronic device, based on the probability information and similarity information indicating similarity between each of the identified user actions and the at least one input.

The processor may be further configured to map the at least one activity to the at least one IoT device, based on any one or any combination of a plurality of pre-trained regression functions, and each of the plurality of pre-trained regression functions may be identified according to an activity and an IoT device.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

Figure 1:
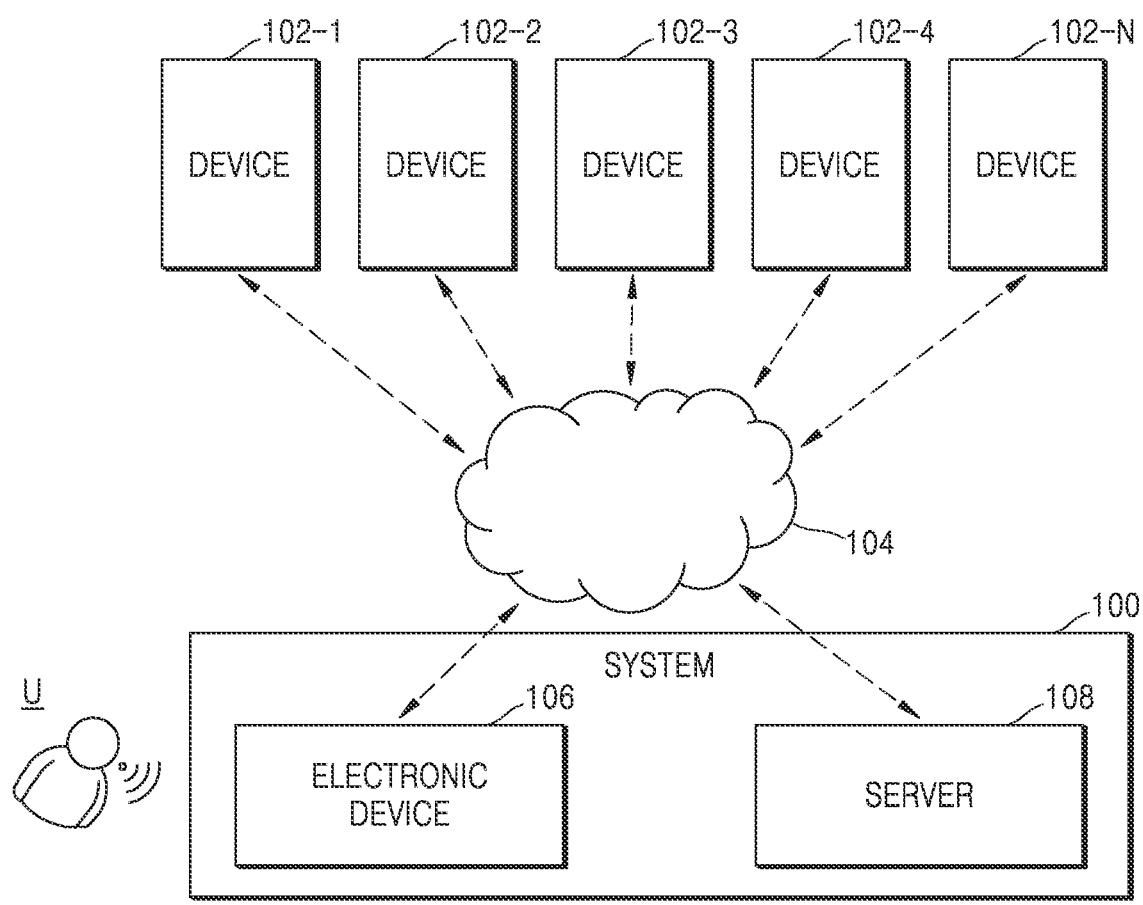
FIG. 1 is a diagram for describing an environment depicting a system in communication with a plurality of devices interacting with the system, according to an embodiment of the disclosure.

For the purpose of promoting an understanding of the principles of embodiments, reference will now be made to the embodiment illustrated in the drawings and language will be used to describe the same. It will nevertheless be understood that no limitation of the scope of the embodiments is thereby intended, such alterations and further modifications in the illustrated system, and such further applications of the principles as illustrated therein being contemplated as would normally occur to one skilled in the art. Unless otherwise defined, all technical and scientific terms used herein have the same meaning as understood by one of ordinary skill in the art to which this disclosure belongs. The system, methods, and examples provided herein are illustrative only and not intended to be limiting.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the embodiments. Furthermore, the one or more elements may have been represented in the drawings by various symbols, and the drawings may show only those details that are pertinent to understanding the embodiments of the disclosure to not obscure the drawings with details that will be readily apparent to those of ordinary skill in the art having benefit of the description herein.

The terms and words used in the following description and claims are not limited to the bibliographical meanings, but, are used to enable a clear and consistent understanding of the disclosure. Accordingly, it may be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. Additionally, expressions such as "at least one of," when preceding a list of elements, modify the entire list of elements and do not modify the individual elements of the list. For example, the expression, "at least one of a, b, and c," may be understood as including only a, only b, only c, both a and b, both a and c, both b and c, or all of a, b, and c.

The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below may be implemented or supported by one or more computer programs, each of which may be formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media in which data may be permanently stored and media in which data may be stored and later overwritten, such as a rewritable optical disc or an erasable memory device.

The term "unit," "manager," "engine," or "device" may refer to a unit that processes at least one function or operation and may be implemented by hardware, software, or a combination of hardware and software. Embodiments of the disclosure will be described below in detail with reference to the accompanying drawings.

FIG. 1 is a diagram for describing an environment depicting a system 100 in communication with a plurality of devices 102 interacting with the system 100, according to an embodiment of the disclosure.

Referring to FIG. 1, the system 100 may be in communication with the plurality of devices 102 through a network 104. The system 100 may be configured to perform actions on the plurality of devices 102 based on at least one input received from a user U. The at least one input may include any one or any combination of an utterance or a gesture. In an embodiment, the plurality of devices 102 may interchangeably be referred to as Internet-of-Things (IoT)-enabled devices 102-1, 102-2, 102-3, 102-4, . . . , 102-*n*.

The IoT devices 102-1, 102-2, 102-3, 102-4, . . . , 102-*n* may collectively be referred to as the IoT devices 102, without departing from the scope of the disclosure. Further, the IoT devices 102 may individually be referred to as an IoT device 102-1, an IoT device 102-2, an IoT device 102-3, an IoT device 102-4, . . . and an IoT device 102-*n*, without departing from the scope of the disclosure. In an embodiment, the IoT devices 102 may individually be referred to as the IoT device 102, without departing from the scope of the disclosure.

In an embodiment, the IoT devices 102 may include, but are not limited to, physical devices, vehicles, home appliances, and any other electronic item that may be connected to the network 104. For example, with respect to the home appliances, the IoT devices 102 may include, but are not limited to, an Air Conditioner (AC), a refrigerator, a sound system, a television, a cellular device, a microwave, a communication device, and a washing machine.

The IoT devices 102 may interact with the system 100 through a network 104.

The network 104 may be a wired network or a wireless network. The network 104 may include, but is not limited to, a mobile network, a broadband network, a Wide Area Network (WAN), a Local Area Network (LAN), and a Personal Area Network.

In one embodiment, the system 100 may include at least one electronic device, such as an electronic device 106 or a server 108 in communication with the electronic device 106 through the network 104. In such an embodiment, the electronic device 106 may be configured to receive the at least one input from the user U to perform at least one action on at least one IoT device among the IoT devices 102. The electronic device 106 may be configured to determine whether at least one predefined action is obtainable corresponding to the at least one input. The electronic device 106 may perform the at least one predefined action, if the at least one predefined action is obtainable corresponding to the at least one input. Conversely, if the at least one predefined action is not obtainable then the system 100 may identify a set of actions performed by the user U in the environment on the IoT devices 102 subsequent to the receipt of the at least one input.

In another embodiment, the system 100 may include only the electronic device 106 for performing the actions on the IoT devices 102 based on the at least one input received from the user U. In such an embodiment, the electronic device 106 may be configured to perform functionalities of the server 108 that are explained in detail in the subsequent sections of the disclosure.

The disclosure is explained with respect to the system 100 including the electronic device 106 and the server 108 for performing actions on the IoT devices 102. However, it may be appreciated by a person skilled in the art that it may not be construed as limiting, and the disclosure is equally applicable to the system 100 including only the electronic device 106, without departing from the scope of the disclosure. Constructional and operational details of the system 100 are explained in detail in the subsequent sections of the disclosure.

Figure 2:
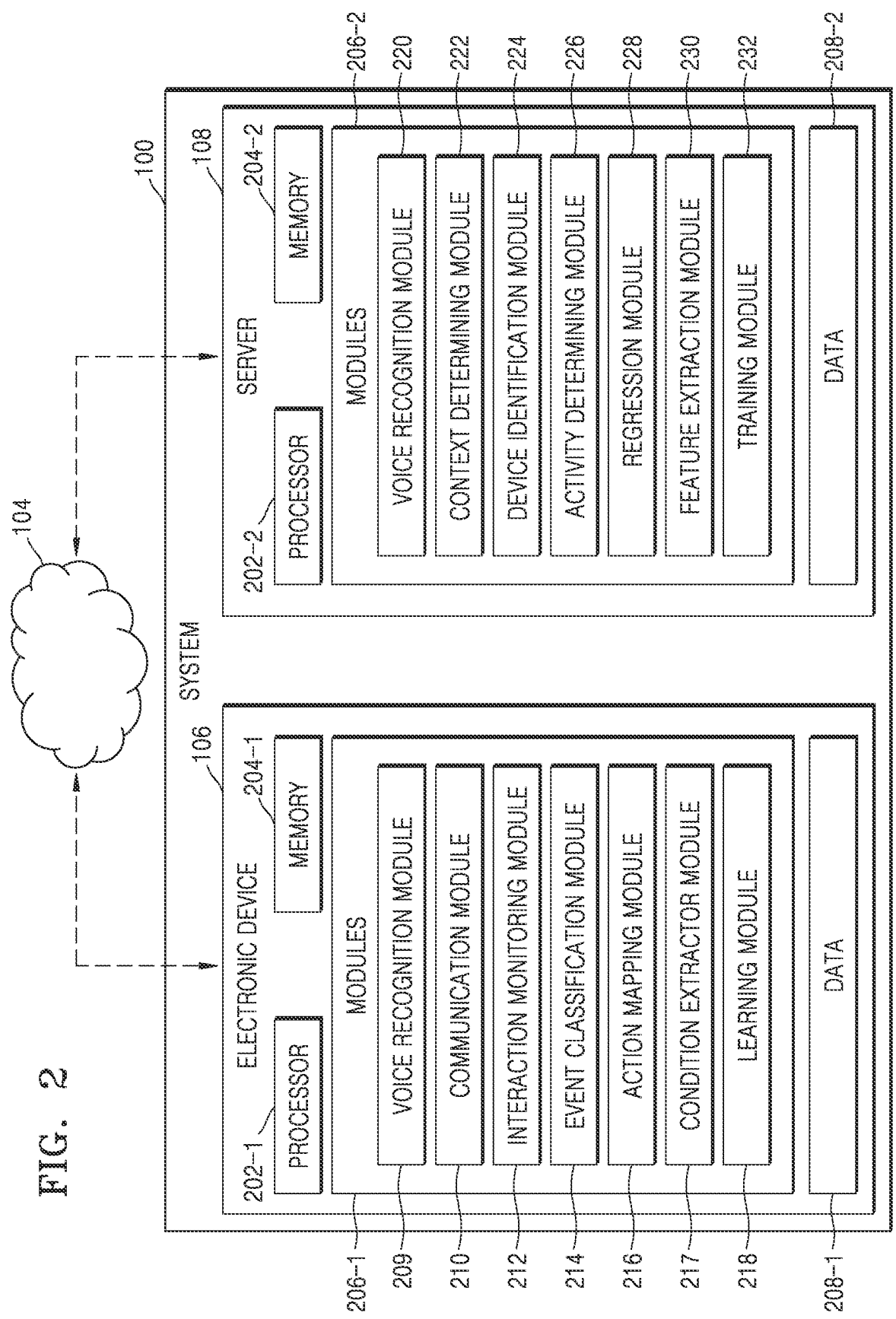
FIG. 2 is a block diagram of the system for performing actions on at least one device among the plurality of devices, according to an embodiment of the disclosure.

FIG. 2 is a block diagram of the system 100 for performing actions on at least one device among the plurality of devices 102, according to an embodiment of the disclosure.

As explained earlier, the system 100 includes the electronic device 106 and the server 108 in communication with the electronic device 106 through the network 104. In an embodiment, the electronic device 106 and the server 108 may include processors 202-1 and 202-2, respectively. The processors 202-1 and 202-2 may collectively be referred to as the processor 202. The processor 202 can be a single processing unit or a number of units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions.

The functions of the various elements shown in the figure, including any functional blocks labeled as "processor(s)," may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Further, the electronic device 106 and the server 108 may include memory 204-1 and 204-2, respectively. The memory 204-1 and 204-2 may collectively be referred to as the memory 204. The memory 204-1 and the memory 204-2 may be coupled to the processor 202-1 and the processor 202-2, respectively. The memory 204 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The electronic device 106 and the server 108 may include modules 206-1 and 206-2, respectively. The modules 206-1 and 206-2 may collectively be referred to as the module 206. Further, the electronic device 106 and the server 108 may include data 208-1 and 208-2, respectively, hereinafter collectively referred to as data 208. The module 206-1 and the module 206-2 may be coupled to the processor 202-1 and the processor 202-2, respectively. The module(s) 206, amongst other things, include routines, programs, objects, components, data structures, etc., which perform tasks or implement data types. The module(s) 206 may also be implemented as, signal processor(s), state machine(s), logic circuitries, and/or any other device or component that manipulate signals based on operational instructions.

Further, the module(s) 206 may be implemented in hardware, instructions executed by at least one processing unit, for example, the processor 202, or by a combination thereof. The processing unit may include a computer, a processor, a state machine, a logic array and/or any other suitable devices capable of processing instructions. The processing unit may be a general-purpose processor that executes instructions to cause the general-purpose processor to perform operations or, the processing unit may be dedicated to perform the functions. In some example embodiments, the module(s) 206 may be machine-readable instructions (software, such as web-application, mobile application, program, etc.) that, when executed by a processor/processing unit, perform any of the described functionalities.

In an implementation, the module(s) 206-1 of the electronic device 106 may include a voice recognition module 209, a communication module 210, an interaction monitoring module 212, an event classification module 214, an action mapping module 216, a condition extractor module 217, and a learning module 218, but this is an example, and elements of the electronic device 106 are not limited thereto.

The voice recognition module 209, the communication module 210, the interaction monitoring module 212, the event classification module 214, the action mapping module 216, the condition extractor module 217, and the learning module 218 are in communication with each other. The data 208-1 serves, amongst other things, as a repository for storing data processed, received, and generated by one or more of the modules 206-1.

Similarly, in an implementation, the module(s) 206-2 of the server 108 may include a voice recognition module 220, a context determining module 222, a device identification module 224, an activity identification module 226, a regression module 228, a feature extraction module 230, and a training module 232, but this is an example, and elements of the electronic device 106 are not limited thereto. The voice recognition module 220, the context determining module 222, the device identification module 224, the activity identification module 226, the regression module 228, the feature extraction module 230, and the training module 232 are in communication with each other. The data 208-2 serves, amongst other things, as a repository for storing data processed, received, and generated by one or more of the modules 206-2.

In an embodiment of the disclosure, the modules 206-1 and 206-2 may be implemented as part of the processor 202-1 and the processor 202-2, respectively. In another embodiment of the disclosure, the modules 206-1 and 206-2 may be external to the processor 202-1 and the processor 202-2, respectively. In yet another embodiment of the disclosure, the modules 206-1 and 206-2 may be part of the memory 204-1 and the memory 204-2, respectively. In another embodiment of the disclosure, the modules 206-1 and the module 206-2 may be part of hardware, separate from the processor 202-1 and the processor 202-1, respectively.

In an embodiment, the electronic device 106 may be configured to obtain at least one input from the user. As mentioned earlier, the at least one input may be embodied as one of an utterance or a gesture. In the present embodiment, the at least one input may interchangeably be referred to as the utterance. Further, the utterance may interchangeably be referred to as the voice input, without departing from the scope of the disclosure. Further, the voice input may be associated with a command, hereinafter referred to as the voice command, indicative of an intended action to be performed on the at least one IoT device, from among the IoT devices 102. The voice recognition module 209 may receive the voice input from the user. The voice recognition module 209 may be embodied as one of an Automatic Speech Recognition (ASR), Computer Speech Recognition (CSR), and Speech-to-Text (STT), but this is an example, and the voice recognition module 209 is not limited thereto. The voice recognition module 209 may be configured to perform various speech processing techniques including, but not limited to, Natural Language Processing (NLP) and Natural Language Understanding (NLU) on the received voice input, without departing from the scope of the disclosure.

Initially, upon obtaining the voice input, the electronic device 106 may determine whether the predefined action is obtainable corresponding to the voice input of the user. For example, the electronic device 106 may identify whether one of a plurality of predefined action corresponds to the received voice input. If the predefined action is obtainable, then the electronic device 106 may transmit instructions to the at least one IoT device for performing the predefined action. However, if the predefined action is not obtainable, then the electronic device 106 may transmit the voice input to the server 108 for further processing. The voice recognition module 209 may transmit the voice input to the communication module 210. Subsequently, the communication module 210 may transmit the voice input to the server 108 for further processing.

Figure 3A:
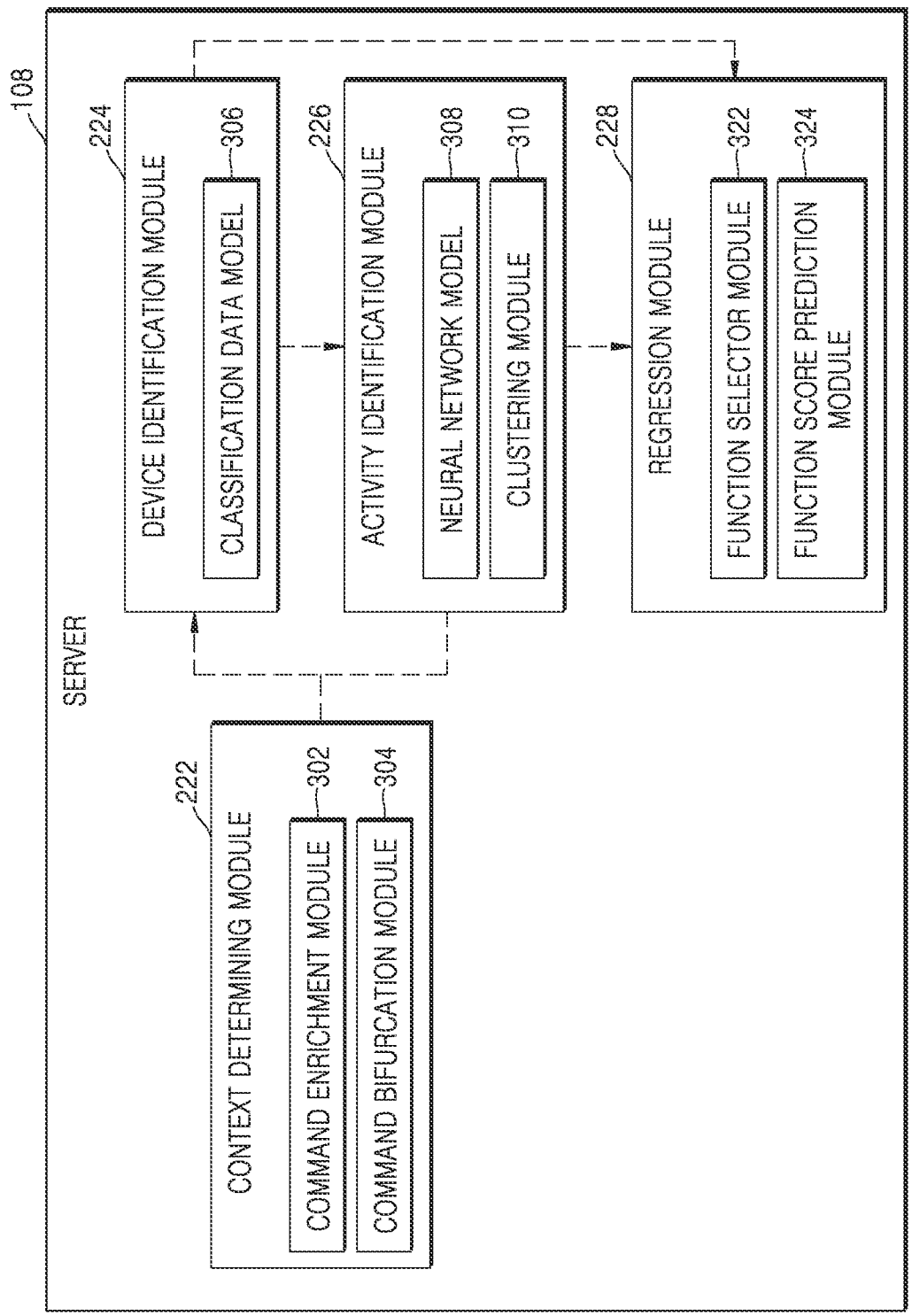
FIG. 3A is a block diagram for describing a method of identifying the actions to be performed on the at least one device based on an input of an user, according to an embodiment of the disclosure.

FIG. 3A is a block diagram for describing a method of identifying the actions to be performed on the at least one device based on the input of the user, according to an embodiment of the disclosure.

Referring to FIG. 2 and FIG. 3A, the server 108 may be configured to receive the voice input from the electronic device 106. The voice recognition module 220 may be configured to receive the voice input from the electronic device 106. In an embodiment, the voice recognition module 220 may include one of an Automatic Speech Recognition (ASR), Computer Speech Recognition (CSR), and Speech-to-Text (STT). The voice recognition module 220 may be configured to perform various speech processing techniques including, but not limited to, Natural Language Processing (NLP) and Natural Language Understanding (NLU) on the received voice input, without departing from the scope of the disclosure. In an embodiment, the server 108 may be configured to receive metadata including, but not limited to, states associated with the IoT devices 102.

The server 108 may be configured to identify at least one object or context associated with the voice input. In an embodiment, the context determining module 222 may receive the voice command associated with the voice input of the user from the voice recognition module. The context determining module 222 may be configured to identify the at least one object or the context in the voice command associated with the voice input. For instance, if the voice input is "prepare noodles," then the context determining module 222 determines the object as 'noodles' and context as 'preparing food'. In another instance, if the voice input is 'I want to watch current news', then the context determining module 222 determines the object as 'current news' and context as 'watching video content'.

Referring to FIG. 3A, the context determining module 222 may include a command enrichment module 302 and a command bifurcation module 304. The command enrichment module 302 may be configured to enrich the voice command by using external databases including, but is not limited to, knowledge graphs and DB-Pedia. The command enrichment module 302 may enrich vocabulary associated with the voice command based on the identified object and the identified context of the voice input to generate an enriched voice command. For instance, the command enrichment module 302 may enrich the voice command by including relative keywords in the voice command based on the identified object and the identified context of the voice input.

For example, the command enrichment module 302 may enrich the voice command associated with the voice input, i.e., "prepare noodle." In such an example, the command enrichment module 302 may enrich the voice command by including relative keywords, such as make, read, consume, and cook. Similarly, the command enrichment module 302 may enrich the voice command by including relative keywords, such as brand names associated with noodles.

The context determining module 222 may be configured to determine a set of characteristics associated with the user. In an embodiment, the set of characteristics includes activity characteristics and contextual characteristics associated with the user. For instance, the contextual characteristics may include, but are not limited to, a location of the user, user routines, and status of the IoT devices in the vicinity of the user. The activity characteristics may include, but are not limited to, a type of activity being performed by the user.

For instance, the user provides the voice input, such as 'prepare noodle' while interacting with one of the IoT devices, such as 'microwave' located in kitchen. In such an instance, the context determining module 222 may determine the location of the user as 'kitchen'. Further, based on the status of the IoT devices located in kitchen, the context determining module 222 may determine the type of activity as 'cooking preparation' being performed by the user.

In another instance, the user provides the voice input, such as 'prepare noodle' while interacting with one of the IoT devices, such as 'television' located in drawing room. In such an instance, the context determining module 222 may determine the location of the user as 'drawing room'. Further, based on the status of the IoT devices located in kitchen, the context determining module 222 may determine the type of activity as 'watching' being performed by the user.

Further, the command bifurcation module 304 of the context determining module may be in communication with the command enrichment module 302. The command bifurcation module 304 may receive the enriched voice command from the command enrichment module 302. The command bifurcation module 304 may be configured to categorize each of the identified objects and the context in a plurality of categories based on the set of characteristics. Each of the plurality of categories may be indicative of a type of object and a type of action.

In an embodiment, the command bifurcation module 304 may be configured to receive the enriched voice command from the command enrichment module 302. Upon receiving the enriched voice command, the command bifurcation module 304 may categorize each of the identified objects and the context in the plurality of categories. In an implementation, the command bifurcation module 304 may categorize each of the identified objects and the context in the plurality of categories based on the set of characteristics.

In the disclosure, the categorized objects and the categorized context associated with the voice input may collectively be referred to as a processed voice command, without departing from the scope of the disclosure.

For instance, the voice input received from the user is 'prepare noodles'. In such an instance, the command bifurcation module 304 may categorize the identified object, i.e., noodles, in a category, such as 'food items'. Similarly, the command bifurcation module 304 may categorize the identified context, i.e., prepare, in a category, such as 'trying to cook'.

For instance, the command enrichment module 302 may enrich the voice command, such as 'prepare Tasty noodle'. Further, the command bifurcation module 304 may receive the enriched voice command. In such an instance, the command bifurcation module 304 may categorize the identified object, i.e., 'noodle' in a category, such as 'food items' Further, the command bifurcation module 304 may categorize the object, i.e., 'Tasty' in a category, such as 'brand names'. Furthermore, the command bifurcation module 304 may categorize the context, i.e., 'preparing food' in one of categories, such as 'trying to cook' and 'trying to order'.

Referring to FIG. 3A the device identification module 224 may be configured to receive the processed voice command from the context determining module 222. The device identification module 224 may be configured to identify a list of IoT devices from among the IoT devices 102 based on the categorized object and the categorized context associated with the voice input. Further, the device identification module 224 may be configured to assign a probability score to each of the enlisted IoT devices. The probability score may be indicative of likelihood that corresponding IoT device is operable to perform at least one action associated with the voice input.

In an embodiment, the device identification module 224 may include a classification data model 306. The classification data model 306 may be trained by the training module 232 using training data, learned data, and real-time data. The training data may include, but is not limited to, data associated with co-relation between multiple IoT devices with respect to past voice inputs uttered by the user corresponding to such IoT devices. The classification data model 306 may process data, i.e., the categorized object and the categorized context, to identify the list of IoT devices from among the IoT devices 102. Further, the classification data model 306 may assign the probability score to each of the enlisted IoT devices. In the disclosure, the list of IoT devices and corresponding probability scores may collectively be referred to as the device identification data, without departing from the scope of the disclosure.

Table 1 illustrates the list of IoT devices with respect to corresponding probability scores, according to an embodiment of the disclosure. It may be appreciated by a person skilled in the art that Table 1 is included to provide a better understanding of the disclosure and therefore, may not be construed as limiting.

TABLE 1

| DEVICES | PROBABILITY SCORES |
|---|---|
| DEVICE 101-1 | 0.335 |
| DEVICE 101-2 | 0.297 |
| DEVICE 101-3 | 0.134 |
| DEVICE 101-n | 0.211 |

For example, referring to Table 1, the device 101-1, the device 101-2, and the device 101-3 may be embodied as 'microwave', 'refrigerator', and 'television', respectively. In such an example, the probability score of the first device 101-1, i.e., 'microwave' indicates highest likelihood that the first device 101-1 is to be operated with respect to the voice input received from the user. Similarly, the probability score of the third device 101-3, i.e., 'television' indicates lowest likelihood that the third device 101-3 is to be operated with respect to the voice input.

As mentioned earlier, the activity identification module 226 may be in communication with the context determining module 222 and the device identification module 224. The activity identification module 226 may be configured to receive the device identification data from the device identification module 224. Further, the activity identification module 226 may be configured to receive the categorized object and the categorized context from the context determining module 222.

The activity identification module 226 may be configured to identify a list of activities associated with the voice input of the user based on the device identification data, the set of characteristics associated with the user, learned data, the categorized object, and the categorized context. In an embodiment, each activity from among the list of activities may be associated with one or more actions. Further, the activity identification module 226 may be configured to assign a probability score to each of the enlisted activity. The probability score may be indicative of likelihood that corresponding activity is to be performed with respect to the voice input uttered by the user.

Figure 3B:
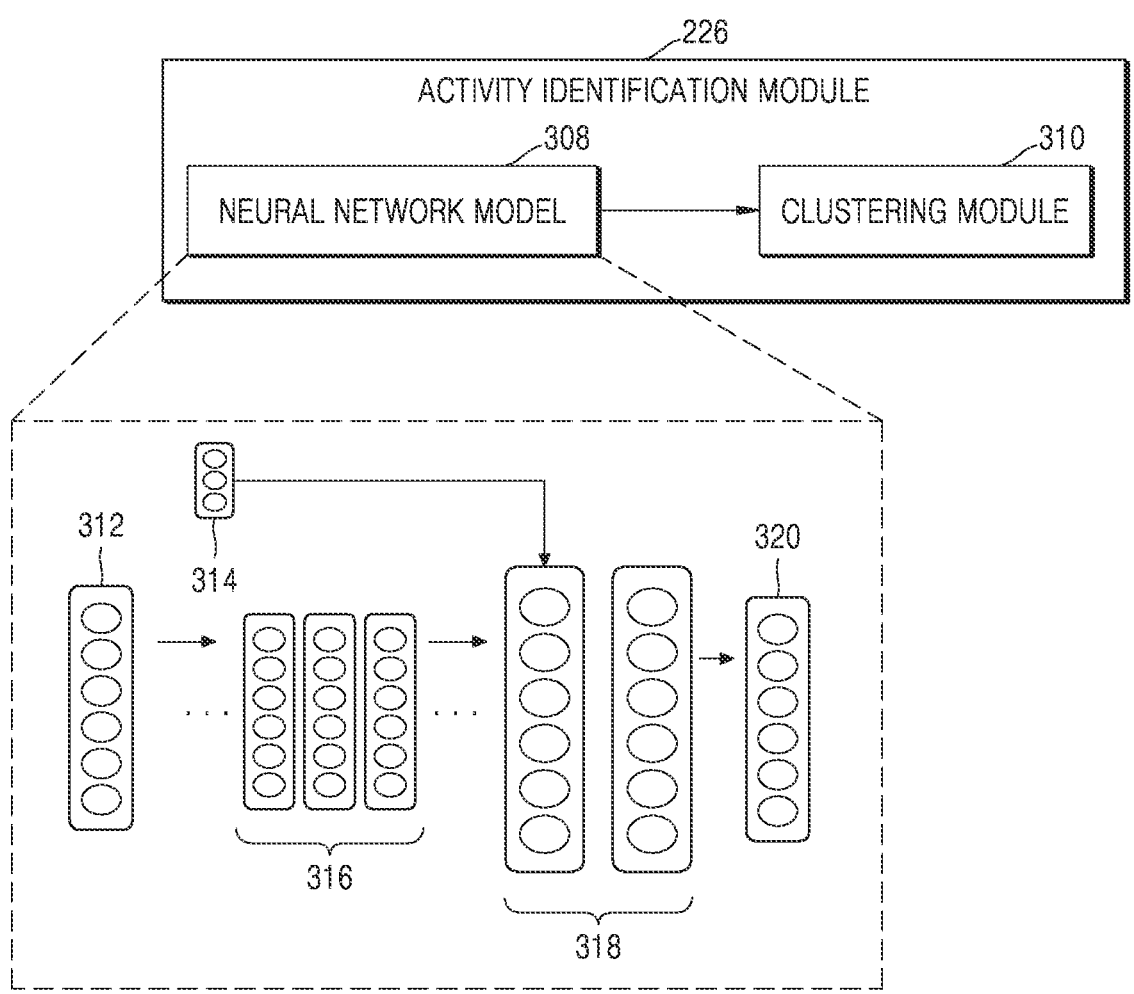
FIG. 3B is a diagram for describing a method of identifying activities in detail, according to an embodiment of the disclosure.

FIG. 3B is a diagram for describing a method of identifying activities in detail, according to an embodiment of the disclosure.

Referring to FIG. 3B, in an embodiment, the activity identification module 226 may include a Neural Network (NN) model 308 and a clustering module 310. In an embodiment, the NN model 308 may be embodied as the Deep Neural Network (DNN) model, without departing from the scope of the disclosure. The NN model 308 denotes an artificial neural network model simulating a neural network of a human brain, and is not limited to an artificial neural network model using an algorithm. The NN model 308 may be trained by the training module 232 to identify various activities and corresponding probability that such activities are to be performed with respect to the voice input uttered by the user. In an embodiment, the NN model 308 may be trained by the training module 232 using training data including, but not limited to, data associated with past voice inputs of the user and corresponding activities performed on the IoT devices 102. For example, the device identification data, the categorized object and the categorized context associated with the past voice inputs of the user are used as the training data of the NN model 308.

The NN model 308 may receive the device identification data from the device identification module 224. The NN model 308 may also receive data, i.e., the categorized object and the categorized context associated with the enriched voice command, from the context determining module 222. The NN model 308 may process any one or any combination of the training data, historical data, learned data, and real-time data by using a learning algorithm. The learned data may be obtained by processing any one or any combination of the trained data and the real-time data in the NN model 308. The learning algorithm may be embodied as one of a supervised learning algorithm, an un-supervised learning algorithm, and a semi-supervised learning algorithm. In the present embodiment, the learning algorithm may be embodied as the Un-supervised Learning Algorithm (ULA), without departing from the scope of the disclosure.

In the illustrated embodiment, initially, the NN model 308 may include a first input layer 312, a second input layer 314, a plurality of hidden layers 316, and a plurality of combining layers 318. The plurality of hidden layers 316 may individually be referred to as the first hidden layer 316-1, the second hidden layer 316-2, . . . , and nth hidden layer 316-n. Similarly, the plurality of combining layers 318 may individually be referred to as the first combining layer 318-1, the second combining layer 318-2, . . . , and nth combining layer 318-n. In such an embodiment, the plurality of hidden layers 316 may be in a range of 8 hidden layers to 12 hidden layers, without departing from the scope of the disclosure.

The first input layer 312 and the second input layer 314 of the NN model 308 may receive data from the context determining module 222 and the device identification module 224, respectively. The first input layer 312 and the second input layer 314 may receive data, i.e., the categorized objects and the categorized context, and the device identification data, respectively. The plurality of hidden layers 316 of the NN model 308 may process output received from the first input layer 312. Subsequently, the first combining layer 318-1 may receive the device identification data and output from the nth hidden layer 316-n. The plurality of combining layer 318 may process the device identification data and the output from the nth hidden layer 316-n to generate a combined output 320.

Further, the clustering module 310 of the activity identification module 226 may receive the combined output from the NN model 308. The clustering module 310 may be configured to form data cluster, such as the list of activities indicative of actions that may be associated with the voice input of the user. In an embodiment, the clustering module 310 may be implemented with a clustering algorithm to process the combined output received from the NN model 308 to form the data cluster. Further, the clustering module 310 may process the data cluster to assign the probability score to each of the enlisted activities. In the disclosure, the list of activities and corresponding probability scores may collectively be referred to as the activity determination data, without departing from the scope of the disclosure.

Table 2 illustrates the list of activities with respect to corresponding probability scores, according to an embodiment of the disclosure. It may be appreciated by a person skilled in the art that Table 2 is included to provide a better understanding of the disclosure and therefore, may not be construed as limiting.

TABLE 2

| ACTIVITIES | PROBABILITY SCORES |
|---|---|
| FIRST ACTIVITIES | 0.568 |
| SECOND ACTIVITIES | 0.89 |
| THIRD ACTIVITIES | 0.124 |
| NTH ACTIVITIES | 0.56 |

For example, referring to Table 2, the first activity, the second activity, and the third activity may be embodied as 'ordering', 'cooking', and 'watching', respectively. The first activity, i.e., 'ordering' may further be associated with sub-activities, interchangeably referred as actions, such as 'ordering food' from online retailer and 'ordering food' from offline retailer. The second activity, i.e., 'cooking' may further be associated with sub-activities, such as 'baking', 'pre-heating', and 'grilling'. Further, the third activity, i.e., 'watching' may further be associated with sub-activities, such as 'watching cooking tutorials'. In the present example, the probability score of the second activity, i.e., 'cooking' indicates highest likelihood that the second activity is to be performed with respect to the voice input received from the user. Similarly, the probability score of the third activity, i.e., 'watching' indicates lowest likelihood that the third activity is to be performed with respect to the voice input.

Figure 3C:
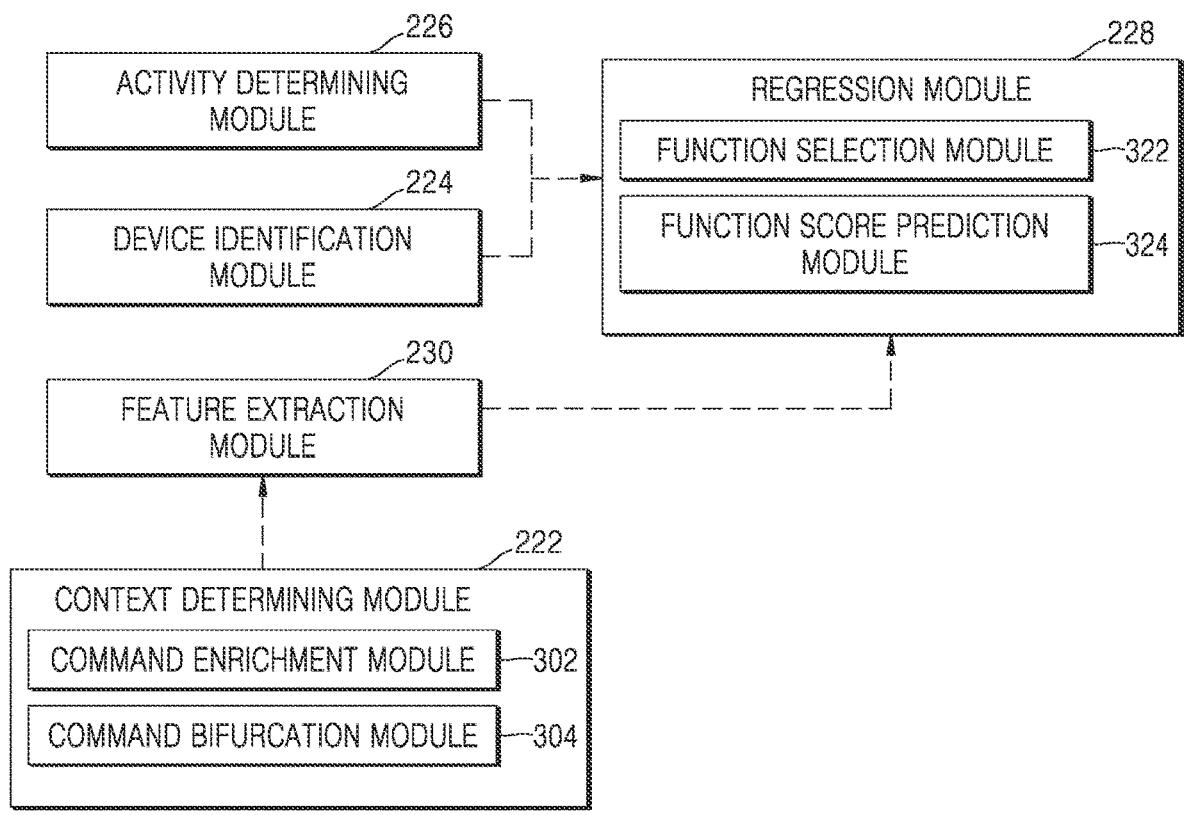
FIG. 3C is a block diagram for describing a method of identifying the actions to be performed on the at least one device based on the input of the user, according to another embodiment of the disclosure.

FIG. 3C is a block diagram for describing a method of identifying the actions to be performed on the at least one device based on the input of the user, according to another embodiment of the disclosure.

Referring to FIG. 3C, the regression module 228 may be in communication with the activity identification module 226, the device identification module 224, and the feature extraction module 230. The regression module 228 may be configured to receive the device identification data from the device identification module 224. Further, the regression module 228 may be configured to receive the activity determining data from the activity identification module 226. The regression module 228 may be configured to correlate each of the enlisted IoT devices with each of the enlisted activities based on the assigned probability score. The regression module 228 may be configured to map each of the enlisted IoT devices to each of the enlisted activities based on the correlation.

Further, in an embodiment, the server 108 may determine candidate actions corresponding to each of the mapped IoT devices based on corresponding mapped activities, the at least one object, and the context associated with the at least one utterance. For example, if the IoT device, such as microwave, is mapped to the activity, such as cooking, based on probability scores, then the server 108 may determine candidate actions, such as pre-heating food at 110 degrees or baking food for 5 minutes. In an embodiment, each of the mapped IoT devices may be associated with a set of actions. In such an embodiment, the server 108 may determine the candidate actions from among the set of actions based on the corresponding mapped activity, the at least one object and the context of the voice input.

In the illustrated embodiment, the regression module 228 may include a function selection module 322 and a function score prediction module 324. The function selection module 322 may receive the device identification data and the activity determining data from the device identification module 224 and the activity identification module 226, respectively. The function selection module 322 may be configured to select a regression function from among a plurality of pre-trained regression functions. The plurality of pre-trained regression functions may interchangeably be referred to as the pre-trained regression functions. In an embodiment, each of the pre-trained regression functions may be one of a linear function and a non-linear function, without departing from the scope of the disclosure.

Each of the pre-trained regression functions may be associated with a pair of the mapped IoT device, from among the IoT devices, and corresponding mapped activity, from among the activities. For example, the plurality of pre-trained regression functions may include a first regression function F1, a second regression function F2, . . . , and an nth regression function Fn. In such an example, the first regression function F1 may be associated with correlation of the first device and the second activity. In this regard, the first device may be 'microwave' and the second activity may be 'cooking'. Similarly, the second regression function F2 may be associated with correlation of the second device and the second activity. In this case, the second device may be 'fridge'. Further, the third regression function F3 may be associated with correlation of the first device, i.e., 'microwave' and the first activity i.e., 'ordering'.

The function selection module 322 may correlate each of the enlisted IoT devices with each of the enlisted activities based on the probability score. Subsequently, based on the correlation, the function selection module 322 may select the regression functions for each of the correlated pairs of the IoT devices and the activities. The function score prediction module 324 may receive the selected regression functions from the function selection module 322.

Further, the regression module 228 may be configured to assign an event score to each of the mapped IoT devices, corresponding mapped activities, and the determined candidate actions. The event score may be indicative of probability that the voice input is intended for performing the mapped activity on corresponding mapped IoT devices.

The feature extraction module 230 may receive information regarding the categorized objects and the categorized context from the context determining module 222. The feature extraction module 230 may extract features from the categorized objects and the categorized context. In this regard, the feature includes at least one vector component indicating correlations between the at least one action and the categorized objects or correlations between the at least one action and the categorized context.

In an embodiment, the function score prediction module 324 may receive extracted features associated with the categorized objects and the categorized context from the feature extraction module 230. The function score prediction module 324 may assign the event score to each of the mapped IoT device, corresponding mapped activities, and the determined candidate actions corresponding to the mapped IoT-device by implementing the extracted feature in the regression function received from the feature extraction module 230. In an embodiment, the mapped IoT devices, the mapped activities, the determined candidate actions, and corresponding event scores may collectively be referred to as the IoT interaction data, without departing from the scope of the disclosure.

Table 3 illustrates the event scores corresponding to the mapped IoT devices, corresponding mapped activities, and the determined candidate actions, according to an embodiment of the disclosure. It may be appreciated by a person skilled in the art that Table 3 is included to provide a better understanding of the disclosure and therefore, may not be construed as limiting.

TABLE 3

| DEVICES | ACTIVITIES | ACTIONS | EVENT SCORES |
|---|---|---|---|
| DEVICE 101-1 | FIRST ACTIVITY | FIRST ACTION | 87.01 |
| DEVICE 101-2 | SECOND ACTIVITY | SECOND ACTION | 83.67 |
| DEVICE 101-3 | THIRD ACTIVITY | THIRD ACTION | 36.02 |
| DEVICE 101-n | NTH ACTIVITY | NTH ACTION | 67.02 |

For example, referring to Table 3, the first device 101-1, such as 'microwave', may be mapped corresponding to the first activity, such as 'cooking' and the first actions, such as 'pre-heating at 110 degrees'. The event score assigned to the first device 101-1, the first activity, and the first action is higher than event scores of the others. The higher event score indicates that the probability of the voice input being intended to perform the first action of the first activity on the first device 101-1 is higher than probabilities of the voice input being intended to perform other actions. Similarly, the third device 101-3, such as 'television', may be mapped corresponding to the third activity such as 'watching' and the third action, such as 'selecting news channel'. The event score assigned to the third device 101-3, the third activity, and the third action is lower than event scores of the others. The lower event score indicates that a probability of the voice input being intended to perform the third action of the third activity on the third device 101-3 is lower than probabilities of the voice input being intended to perform other actions.

As explained earlier, the server 108 may be in communication with the electronic device 106 through the network 104. The server 108 may be configured to transmit the IoT interaction data to the electronic device 106 for further processing. The IoT interaction data may include groups of the IoT devices mapped with respect to the activities, the candidate actions, and the event scores assigned to such group. Further, the server 108 may transmit data, such as activity weightage factors and meta-data associated with activities to the electronic device 106. In an example, the meta-data associated with the activity, such as 'cooking' may indicate other related/associated activities, such as 'baking and pre-heating'.

In an embodiment, the server 108 may also provide an activity binary model to the electronic device 106. In this regard, the activity binary model may be employed for predicting activities corresponding to objects and/or context associated with the voice input. For example, the activity binary model may be employed at the electronic device 106 for predicting activity, such as cooking and ordering, corresponding to an object, such as 'noodles', associated with the voice input.

Figure 3D:
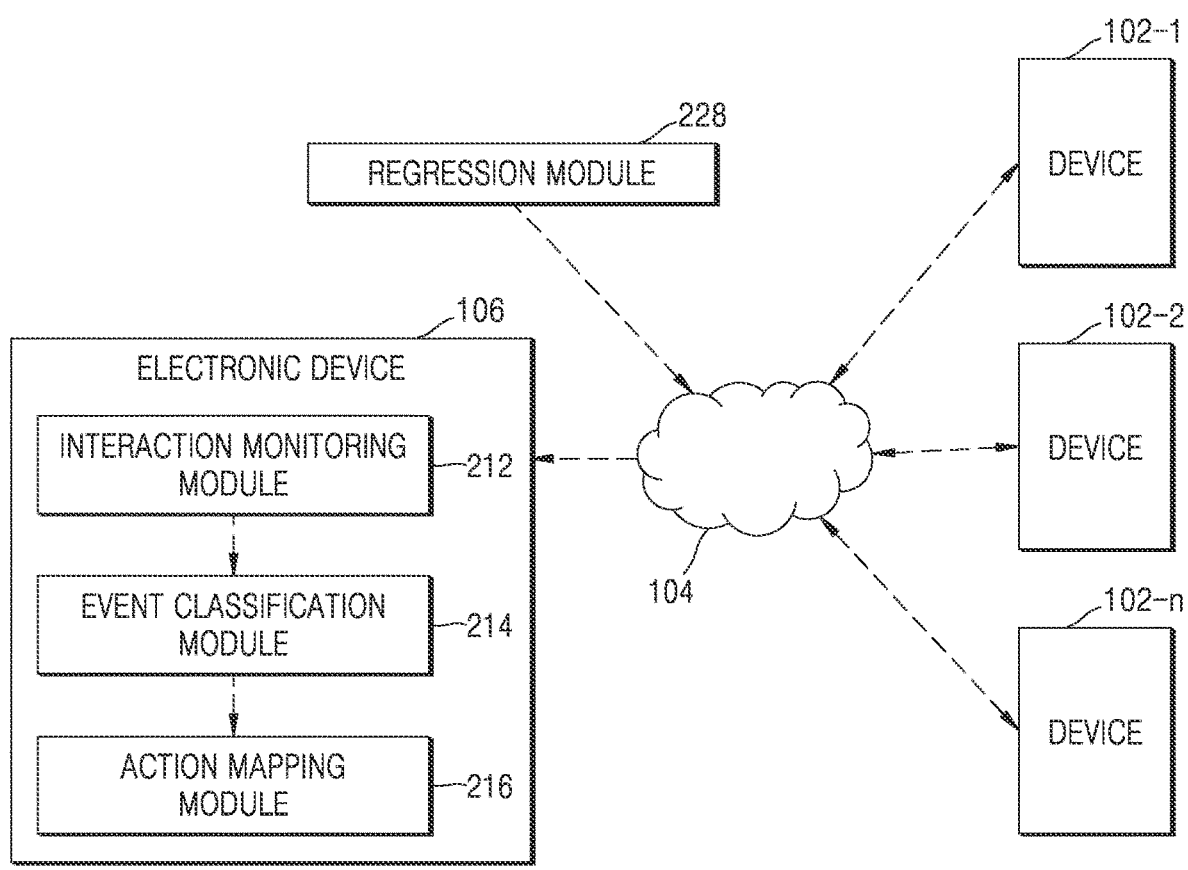
FIG. 3D is a diagram for describing a data flow between a server, an electronic device and the at least one device for controlling the at least one device to perform the actions, according to an embodiment of the disclosure.

FIG. 3D is a diagram for describing a data flow between the server, the electronic device 106 and the at least one device for controlling the at least one device to perform the actions, according to an embodiment of the disclosure.

Referring to FIGS. 3A and 3D, the electronic device 106 may be configured to identify the set of actions performed by the user on any one or any combination of the IoT devices 102 subsequent to receipt of the voice input.

In an embodiment, the electronic device 106 may include a plurality of sensors configured to identify the set of actions performed by the user on any one or any combination of the IoT devices 102. The plurality of sensors may include, but is not limited to, image sensors, audio sensors, proximity sensors, and touch sensors, without departing from the scope of the disclosure. The electronic device 106 may sense gestures of the user via any one or any combination of the image sensors. In addition, the electronic device 106 may sense the voice of the user via any one or any combination of the audio sensors.

In an embodiment, the interaction monitoring module 212 of the electronic device 106 may be configured to ascertain information associated with the at least one action from among the set of actions. The information may be indicative of a user interaction, in real-time, with at least one IoT device from among the IoT devices 102. For instance, the user performs the at least one action, such as operating the microwave, to prepare food. In such an instance, the information associated with the at least one action indicates one of user interactions, such as baking food and pre-heating food. In another instance, the user performs at least one action, such as operating an audio system, to play music. In such an instance, the information associated with the at least one action indicates one of user interactions, such as inserting a Compact Disc (CD) drive in the audio system and selecting FM radio option on the audio system.

The interaction monitoring module 212 may identify the IoT devices 102 operated by the user subsequent to receipt of the voice input. Further, the interaction monitoring module 212 may identify the set of action performed on the identified IoT device 102 by the user. In an embodiment, the identified set of actions may be stored in a buffer memory of the electronic device 106.

For example, the electronic device 106 may receive the voice input, such as 'prepare noodles' from the user. The electronic device 106 may determine that a predefined action is not obtainable with respect to the voice input. The electronic device 106 may provide a notification to the user indicating that the electronic device 106 fails to recognize the voice input. Subsequently, the user may interact with the IoT devices 102, such as the television and the microwave. The user may operate the television to watch cooking lessons and operate the microwave for pre-heating the food. The electronic device 106 may identify the user interactions, i.e., watching cooking lessons and selecting pre-heat settings, corresponding to the television and the microwave, respectively.

Further, the electronic device 106 may be configured to assign a similarity score to the user interaction associated with the at least one action based on the ascertained information. In an embodiment, the event classification module 214 of the electronic device 106 may be configured to classify each of the user interactions into event categories. For instance, the event categories may include, but is not limited to, incidental events, user initiated events, associated events, and response events.

In an embodiment, if the event classification module 214 identifies that a state of a user interaction is changing frequently over a period of time, then the event classification module 214 may classify the user interaction in the event category, i.e., the incidental events. For example, the user is interacting with the television and frequently changing television channels. In such an example, the event classification module 214 may classify such user interaction in the event category, i.e., the incidental events.

Further, the event classification module 214 may classify a user interaction in the event category, i.e., the user initiated event, if the event classification module 214 determines that explicit interaction of the user may be required to perform the user interaction. For example, the user interaction associated with operating the microwave to cook food may be classified in the event category, such as the user initiated event.

The event classification module 214 may classify a user interaction in the event category, i.e., the associated events, if the event classification module 214 determines that the user interaction is performed before or after performing another user interaction. For example, if a first user interaction, such as opening a door of the refrigerator, is performed before a second user interaction, such as switching-on the microwave, then such user interactions are classified as the associated events. In the present example, the first user interaction, such as opening the door of the refrigerator, is associated with the second user interaction, such as switching-on the microwave. The first user interaction may be performed by the user to remove a food item from the refrigerator. Subsequently, the second user interaction may be performed by the user to cook the food item removed from the refrigerator in the microwave.

Further, the event classification module 214 may classify a user interaction in the event category, i.e., the response events, if the event classification module 214 determines that the user interaction may be performed in response to another user interaction or in response to surrounding events in the environment. For example, if the user operates the IoT device, such as a portable phone, to attend a call on such device, then the event classification module 214 may classify the user interaction in the event category, i.e., the response event. Further, in an embodiment, the event classification module 214 may classify user interactions based on pre-classified events stored in the memory.

Upon classifying the user interactions, the action mapping module 216 may assign the similarity score to each of the categorized user interactions. The action mapping module 216 may assign the similarity score to each of the user interactions based on corresponding event category. For instance, a user interaction classified as the associated event may have a higher value of the similarly score compared to another user interaction classified as one of the user initiated event and the incidental event. In an embodiment, the IoT devices, the user interactions performed on the IoT devices, and corresponding similarity scores may collectively be referred to as the user interaction data, without departing from the scope of the disclosure.

Table 4 illustrates the similarity scores corresponding to the IoT devices and corresponding user interactions, according to an embodiment of the disclosure. It may be appreciated by a person skilled in the art that Table 4 is included to provide a better understanding of the disclosure and therefore, may not be construed as limiting.

TABLE 4

| DEVICES | USER INTERACTIONS | SIMILARITY SCORES |
|---|---|---|
| DEVICE 101-1 | FIRST INTERACTION | 90.34 |
| DEVICE 101-2 | SECOND INTERACTION | 81.89 |
| DEVICE 101-3 | THIRD INTERACTION | 10.94 |
| DEVICE 101-N | NTH INTERACTION | 11.34 |

For example, referring to Table 4, the first interaction, such as pre-heating at 110 degrees' corresponds to the first device 101-1, such as the microwave-. The similarity score assigned to the first interaction is higher than the similarity scores of other interactions. The higher similarity score indicates that probability that the voice input being intended to perform the first interaction on the first device 101-1 is higher than probability that the voice input being intended to perform the other interactions. Similarly, the third interaction, such as 'selecting news channel' corresponds to the third device 101-3. The similarity score assigned to the third interaction is lower than the similarity scores of other interactions. The lower similarity score indicates that probability that the voice input being intended to perform the third interaction on the third device 101-3 is lower than probability that the voice input being intended to perform the other interactions.

Referring to FIG. 3C, the electronic device 106 may be configured to receive the IoT interaction data from the server 108 through the network 104. As explained earlier, the IoT interaction data may include the mapped IoT devices, the mapped candidate actions, and corresponding event scores. Upon receiving the IoT interaction data, the electronic device 106 may compare the assigned event score and the assigned similarity score. Further, the electronic device 106 may be configured to determine correlation between the action performed by the user and the voice input based on the comparison.

In an embodiment, the action mapping module 216 of the electronic device 106 may receive the IoT interaction data and the user interaction data. The action mapping module 216 may compare the event score with the similarity score of each of the IoT devices. For instance, the action mapping module 216 may compare the event score of the device 101-1 with the similarity score of the device 101-1. Similarly, the action mapping module 216 may compare the event score of the device 102-1 with the similarity score of the device 102-2. In an example, the event score, i.e., 87.01, and the similarity score, i.e. 90.34 may be assigned to device 101-1, such as the microwave. In such an example, the action mapping module 216 may compare the event score, i.e., 87.01, and the similarity score, i.e. 90.34 assigned to the microwave.

Further, the action mapping module 216 may correlate the action with the voice input received from the user based on the comparison between the event scores and the similarity scores. The action mapping module 216 may select any one or any combination of the candidate actions and corresponding IoT devices to be mapped corresponding to the voice input of the user, based on the comparison between the event scores and the similarity scores. In one embodiment, the mapped action corresponding to the voice input of the user may be stored in the server 108. In such an embodiment, the electronic device 106 may communicate with the server 108 to access the mapped action, upon receiving the voice input from the user. In another embodiment, the mapped action corresponding to the voice input of the user may be stored in the electronic device 106.

In an embodiment, the action mapping module 216 may select any one or any combination of the candidate actions and corresponding IoT device, if the similarity score corresponding to the IoT device is within a deviation limit threshold of the event score corresponding to such IoT device. In one embodiment, a value of the deviation limit threshold for each of the IoT devices may depend on the event category of the user interaction performed on such IoT device. For example, the electronic device 106 may receive the voice input, i.e., 'prepare noodles', from the user. In such an example, the event score corresponding to the device 101-1, such as the microwave, and the first activity, i.e., cooking, may be equal to 87.01. Further, the similarity score corresponding to the microwave and the first interaction, i.e., pre-heating food at 110 degrees, is equal to 90.34. The action mapping module 216 may compare the similarity score, i.e., 90.34 and the event score, i.e., 87.01. Upon comparison, the action mapping module 216 determines that the similarity score, i.e., 90.34 is within the deviation limit threshold, i.e., A=6, of the event score, i.e., 87.01. In such an example, the action mapping module 216 may map the first device 101-1, i.e., the microwave, and the first interaction, i.e., pre-heating food at 110 degrees, corresponding to the voice input, i.e., 'prepare noodles'.

Further, in an embodiment, the condition extractor module 217 may be configured to receive the mapped actions from the action mapping module 216. The condition extractor module 217 may be configured to extract conditional information associated with the mapped action based on the received mapped action. The conditional information may be indicative of at least one condition that may be required to be initiated for performing one of the mapped actions. In an example, a first mapped action is 'removing food' corresponding to the IoT device, such as the refrigerator, and a second mapped action is 'pre-heating food at 110 degrees' corresponding to the IoT device, such as the microwave. In such an example, the condition extractor module 217 may extract the conditional information, i.e., removing food from the refrigerator.

In an embodiment, the interaction monitoring module 212 may be configured to receive the similarity scores assigned to each of the user interactions by the action mapping module 216, in real time. As explained earlier, the user interaction monitoring module 212 may monitor the user interactions performed by the user in an IoT environment. However, the interaction monitoring module 212 may monitor the user interactions until a user interaction having a similarity score less than a threshold value is identified. The interaction monitoring module 212 may monitor, in real time, the user interactions in an IoT environment, subsequent to receiving the voice input from the user. However, if the interaction monitoring module 212 identifies a user interaction having the similarity score less than the threshold value, the interaction monitoring module 212 may terminate monitoring operation of the user interaction in the IoT environment.

In an embodiment, the learning module 218 may be configured to update the data 208-1 upon the at least one action corresponding to the input received from the user is newly identified. In this regard, the data 208-1 may include information regarding the pre-stored actions and user inputs corresponding to the pre-stored actions.

In an embodiment, the system 100 may be operable in a feedback mode to provide notifications to the user in real-time. In such an embodiment, the system 100 may receive the voice input, such as another voice input, from the user. Subsequently, the system 100 may be configured to identify at least one mapped action from a plurality of mapped actions based on the voice input. Each of the plurality of mapped actions may be mapped corresponding to past voice inputs from the user, as explained earlier in the disclosure. The system 100 may be configured to perform at least one action on the at least one IoT device from among the plurality of IoT devices 102 based on the voice input received from the user. Further, the system 100 may configured to notify information associated with the at least one identified mapped action to the user.

For example, the system 100 may receive the voice input, such as 'let's order some food', from the user. The system 100 may perform at least one action, such as 'ordering food from a vendor' corresponding to the voice input. Further, the system 100 may also identify a mapped action, such as 'preparing noodles' from the plurality of mapped actions based on the received voice input. The mapped action, i.e., 'preparing noodles' may be mapped corresponding to a past voice input, such as 'cook food', based on past actions performed by the user in an IoT environment. Subsequently, the system 100 may notify the information associated with the identified mapped action, i.e., 'preparing noodles', to the user. The information may be embodied as a voice notification, such as 'I have learned to prepare Noodles by watching you prepare it, let me know if you want me to prepare it for you'. In an example, the information may be embodied as a visual notification, without departing from the scope of the disclosure.

In an embodiment, the system 100 may be operable in a follow-through mode to provide suggestions to the user in real-time for performing actions in the IoT environment subsequent to completion of a current action being performed by the user. In an embodiment, the system 100 identifies a set of actions performed by the user on at least one the IoT device from among the IoT devices. Further, the system 100 determines a correlation between at least one action from the set of actions and a set of pre-associated actions. The pre-associated actions may include, but is not limited to, past actions mapped corresponding to past voice inputs and user interactions, and the conditional information associated with each of the mapped actions.

In an embodiment, the electronic device 106 may transmit information associated with the at least one action to the server 108. Further, the server 108 may compare the at least one action with the at least one pre-associated action, interchangeably be referred to as the predefined actions, from among the set of pre-associated actions. Subsequently, the server 108 may assign a similarity score to the at least one pre-associated action based on the comparison. The similarity score may be indicative of similarity between the at least action performed by the user and the at least one pre-associated action. Furthermore, the system 100 may control the at least one IoT device to perform the at least one correlated action from among the set of pre-associated actions based on the correlation.

Further, in the present embodiment, the system 100 may be configured to map the at least one action and the at least one pre-associated action to at least one input, such as a past/pre-stored input, based on the correlation. The system 100 may be configured to control the at least one IoT device 102 to perform the at least one action and the at least one pre-associated action on IoT device upon receiving the at least one mapped input from the user.

For example, the system 100 may identify the actions, such as switching-on the microwave and watching noodle preparation tutorials on the television, performed by the user. Subsequently, the system 100 may correlate the actions with the set of pre-associated actions, such as pre-heating noodles at 120 degrees. Further, the system 100 may perform the correlated action, i.e., pre-heating noodles at 120 degrees, on the microwave for preparing the noodles.

In another embodiment, the system 100 may be configured to perform a combinational action based on the correlation between at least one action performed by the user and the voice input. In another embodiment, the system 100 may be configured to perform the combinational action based on the correlation between the action and the set of pre-associated actions. The combinational action may be indicative of at least one suggestion provided to the user and the action performed by the user on the IoT device 102.

In such an embodiment, the electronic device 106 may receive the voice input from the user. Subsequently, the electronic device 106 may determine whether the predefined action is identifiable corresponding to the voice input of the user. If the predefined action is not identifiable, then the electronic device 106 may initiate tracking of the set of actions performed by the user subsequent to utterance of the voice input. Similar to the embodiments of the disclosure as explained earlier, the electronic device 106 may identify the set of actions performed by the user subsequent to utterance of the voice input. In addition, in response to the predefined action corresponding to the voice input being not identifiable, the electronic device 106 may transmit the voice input to the server 108. In this case, the server 108 may obtain information regarding at least one action regarding at least one activity mapped on at least one IoT devices based on the voice input, as explained earlier.

The system 100 may determine the correlation between at least one action from among the set of actions and at least one pre-associated action from among a set of pre-associated actions. For instance, the system 100 may be configured to compare each of the actions performed by the user with the pre-stored actions and historical data. In one embodiment, the electronic device 106 may transmit information associated with each of the actions to the server 108. In such an embodiment, the server 108, in real time, may compare each of the actions performed by the user with the pre-stored actions and the historical data. In another embodiment, the electronic device 106 may compare each of the actions performed by the user with the pre-stored actions and the historical data. The pre-stored actions may include, but is not limited to, the pre-associated actions corresponding to voice inputs and the actions that are mapped corresponding to past voice inputs based on scores, such as the event scores and the similarity scores.

Based on the correlation, the system 100 may assign a similarity score to at least one pre-associated action from among the set of pre-associated actions. The similarity score may be indicative of probability that at least one pre-associated action is to be performed subsequent to completion of the action currently being performed by the user. Subsequently, based on the similarity score, the system 100 may suggest the at least one pre-associated action to be performed. The electronic device 106 may display information for suggesting to control the at least one IoT device to perform the at least one pre-associated action upon completion of a current action being performed by the user.

The electronic device 106 may be configured to receive instructions indicative of authorization to perform the at least one pre-associated action. Accordingly, the electronic device 106 may control the at least one IoT device to perform the at least one pre-associated action. In an embodiment, the system 100 may be configured to map the actions performed by the user and the at least one pre-associated action to the at least one utterance based on the correlation. Further, the system 100 may be configured to control the at least one IoT device to perform the at least one action and the at least one pre-associated action, upon re-utterance of the at least one utterance by the user.

Figure 4:
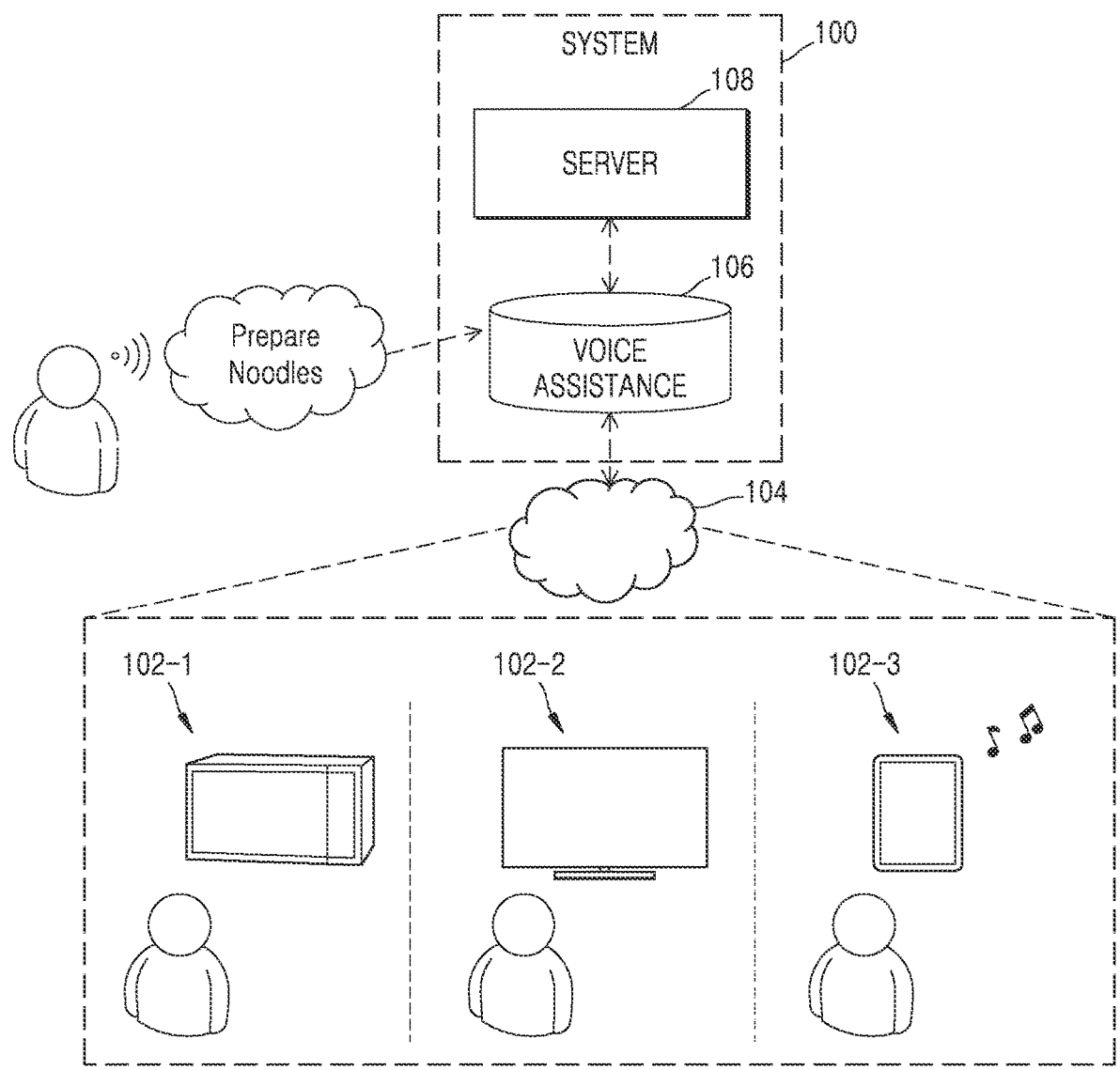
FIG. 4 is a diagram for describing an environment depicting implementation of the system to perform the actions on at least one device among the plurality of devices, according to an embodiment of the disclosure.

FIG. 4 is a diagram for describing an environment depicting implementation of the system 100 to perform the actions on at least one device among the plurality of devices 102, according to an embodiment of the disclosure.

Referring to FIG. 4, the electronic device 106 may be a voice assistance device 106, without departing from the scope of the disclosure. The electronic device 106 may receive a voice input, such as 'prepare noodles' from the user. Subsequently, the electronic device 106 may determines whether a set of predefined actions corresponding to the received voice input are identifiable. If the electronic device 106 fails to determine the set of predefined actions, then the electronic device 106 may transmit the voice input to the server 108 for further processing and initiates tracking of user interactions/actions with the IoT devices 102 in the environment.

As shown in FIG. 4, the user may operate the microwave 102-1. The user may place the food in the microwave and select a pre-heating mode of the microwave. Subsequently, the user may operate the television 102-2 and start watching a cooking television channel. Further, the user may operate the smartphone 102-3 to play music. The electronic device 106 may track each of the aforesaid user interactions. Based on the input received from the server and the user interactions, the electronic device 106 may map any one or any combination of the user interactions corresponding to the voice input. In the present embodiment, the electronic device 106 may map the user interactions, such as operating the microwave 102-1 for pre-heating food and watching cooking lessons on the television 102-2. However, owing to low similarity score, the electronic device 106 may not map the user interactions, such as playing music on the smartphone 102-3. Further, if the user re-utters the voice input, i.e., 'prepare noodle', then the electronic device 102 may operate the microwave 102-1 and the television 102-2 to perform actions mapped corresponding to each of the devices 102-1, 102-2, and 102-3.

Figure 5:
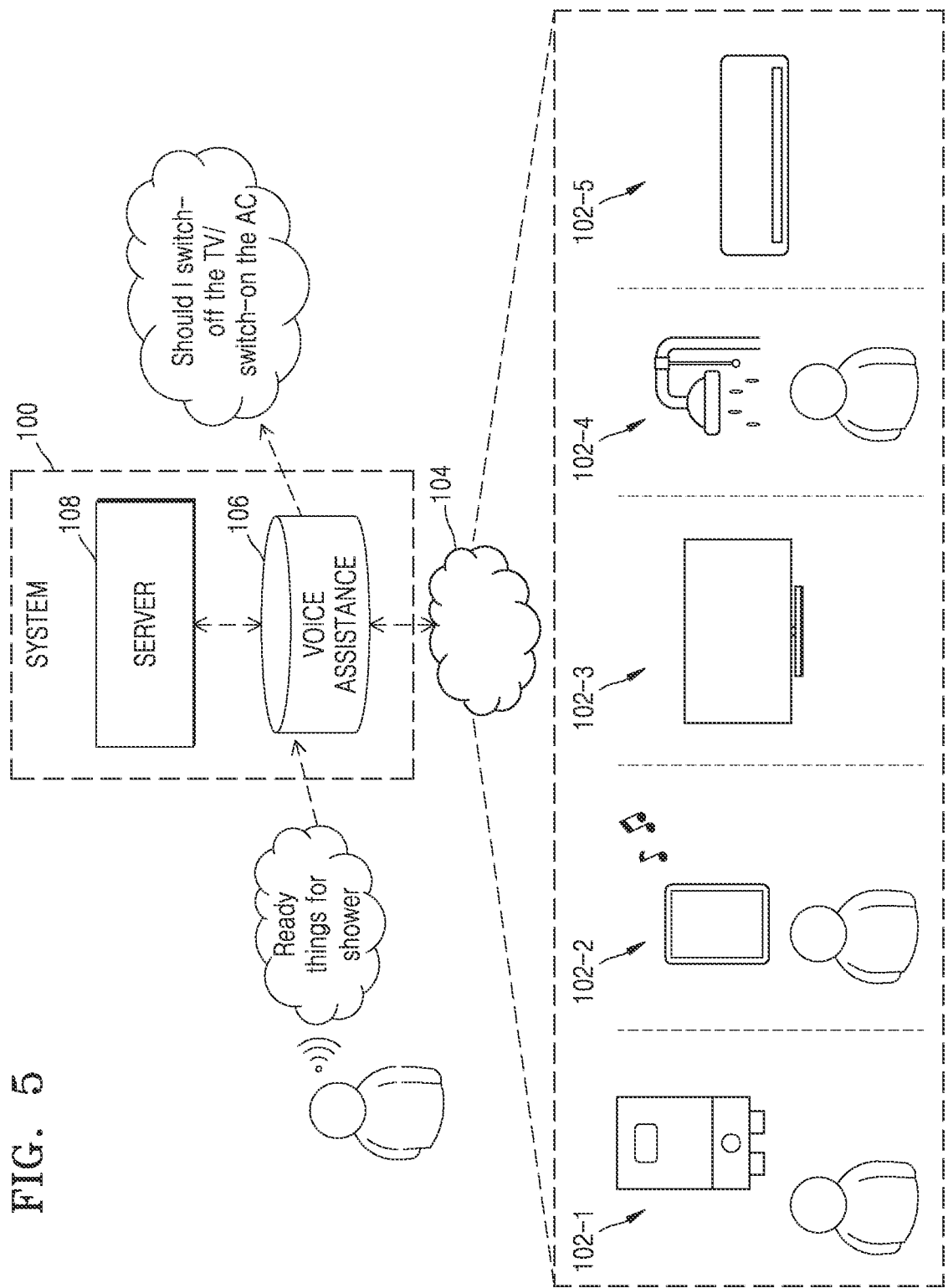
FIG. 5 is a diagram for describing an environment depicting implementation of the system to perform the actions on at least one device among the plurality of devices, according to another embodiment of the disclosure.

FIG. 5 is a diagram for describing an environment depicting implementation of the system 100 to perform the actions on at least one device among the plurality of devices 102, according to another embodiment of the disclosure.

Referring to the FIG. 5, the electronic device 106 may be a voice assistance device 106, without departing from the scope of the disclosure. The electronic device 106 may receive a voice input, such as 'ready things for shower' from the user. Subsequently, the electronic device 106 may determine whether a set of predefined actions are obtainable corresponding to the received voice input. If the electronic device 106 fails to determine the set of predefined actions, then the electronic device 106 may transmit the voice input to the server 108 for further processing and initiates tracking of user interactions/actions with the IoT device 102 in the environment.

As shown in FIG. 5, the user may operate a geyser 102-1 and set a temperature of water at 65 degrees Celsius. Subsequently, the user may operate the smartphone to play music, such as classical music. Based on the aforesaid user interactions, the electronic device 106 may identify that the user is preparing for taking a shower. Accordingly, the electronic device 106 may provide information for suggesting, such as a message of 'may I switch-off the TV' to the user. In an example, the electronic device 106 may provide information for suggesting, such as the message of 'may I prepare you for shower' to the user.

The electronic device 106 may receive an instruction from the user indicating authorization to perform the suggested action. Subsequently, the electronic device 106 may track a movement of the user through the IoT device, such as a smart watch, towards a bathroom in the environment. Based on the movement of the user, the electronic device 106 may switch-off the television 102-3 and operate the IoT device, such as a shower head 102-4, when the user reaches in the bathroom. Further, the electronic device 106 may switch-on the AC 102-5, when the user comes out of the bathroom.

Figure 6:
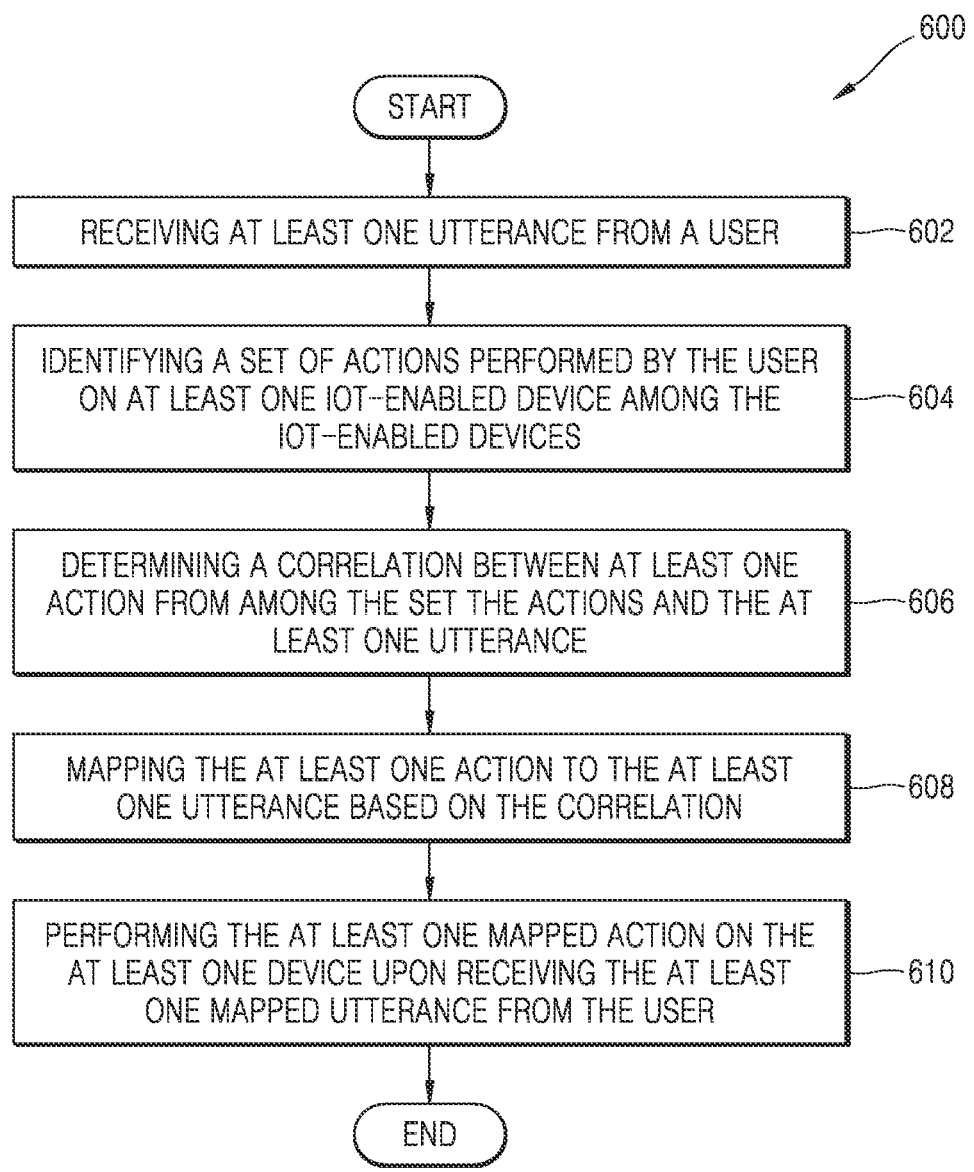
FIG. 6 is a flowchart for describing a method of performing actions on IoT devices, according to an embodiment of the disclosure.

FIG. 6 is a flowchart for describing a method 600 of performing actions on IoT devices, according to an embodiment of the disclosure.

The method 600 may be implemented in the system 100 using components thereof, as described above. For the sake of brevity, details of the disclosure that are explained in details in the descriptions of FIGS. 1 to 5 are not explained in detail in the description of FIG. 6. According to another embodiment, the method 600 may be implemented in the electronic device 106.

In the embodiment of the FIG. 6, for convenience of description, the method 600 is described to be performed by the electronic device 106, but this is an example, and the method 600 is not limited to perform by the electronic device 106.

In operation 602, the electronic device 106 may receive at least one utterance, interchangeably referred to as a voice input, from a user.

In operation 604, the electronic device 106 may identify a set of actions performed by the user on the at least one IoT device among the IoT devices 102 subsequent to the receipt of the at least one utterance. In an embodiment, the electronic device may determine whether the predefined actions are identifiable corresponding to the at least one utterance of the user. If the predefined action is not identifiable, then the electronic device 106 may further process the voice input, as aforementioned operations of the server 108. Further, the electronic device 106 may identify the set of actions performed by the user subsequent to the receipt of the at least one utterance.

In operation 606, the electronic device 106 may determine a correlation between the at least one action from among the set the actions and the at least one utterance.

In operation 608, the electronic device 106 may map the at least one action to the at least one utterance based on the correlation.

In operation 610, the electronic device 106 may perform the at least one action on the at least one device upon receiving an utterance corresponding to the at least one mapped utterance, from user.

Figure 7:
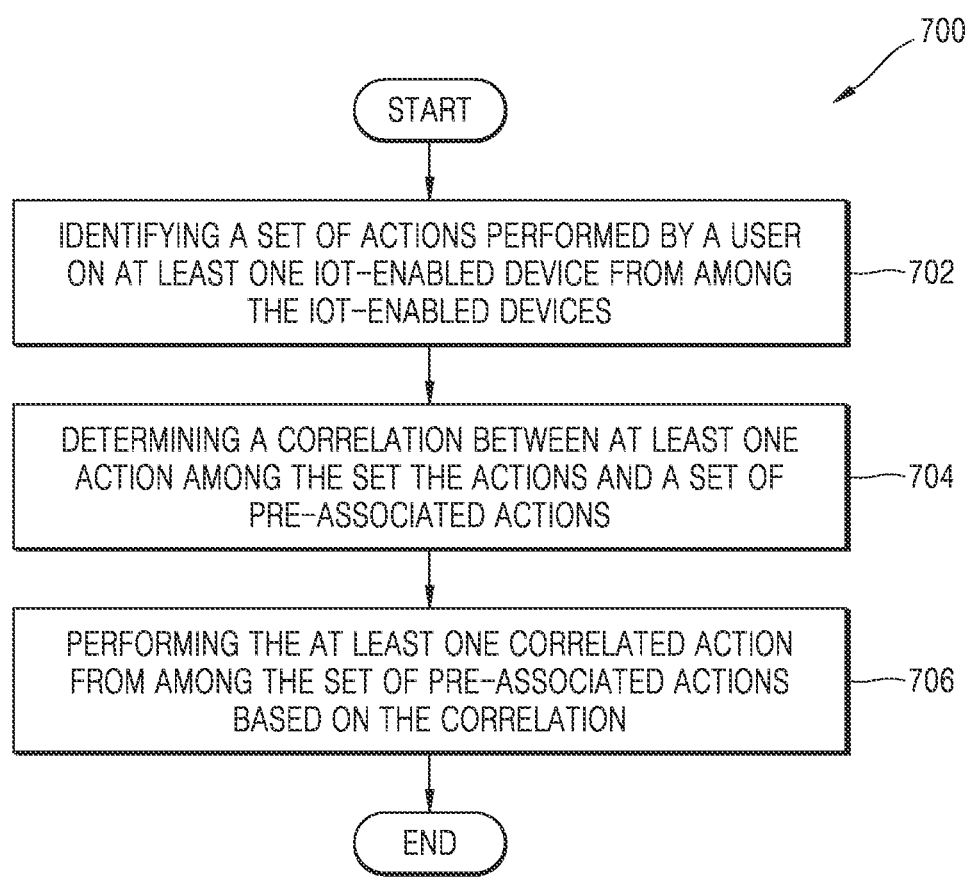
FIG. 7 is a flowchart for describing a method of performing actions on IoT devices, according to another embodiment of the disclosure.

FIG. 7 is a flowchart for describing a method 700 of performing actions on IoT devices, according to another embodiment of the disclosure.

The method 700 may be implemented in the system 100 using components thereof, as described above. For the sake of brevity, details of the disclosure that are explained in details in the description of FIGS. 1 to 6 are not explained in detail in the description of FIG. 7. According to another embodiment, the method 700 may be implemented in the electronic device 106.

In the embodiment of the FIG. 7, for convenience of description, the method 700 is described to be performed by the electronic device 106, but this is an example, and the method 700 is not limited to perform by the electronic device 106.

In operation 702, the electronic device 106 may identify a set of actions performed by a user on at least one IoT device from among the IoT devices 102.

In operation 704, the electronic device 106 may determine a correlation between at least one action among the set the actions and a set of pre-associated actions. The electronic device 106 may compare the at least one action with the at least one pre-associated action from among the set of pre-associated actions. Subsequently, the electronic device 106 may assign the similarity score to the at least one pre-associated action based on the comparison.

In operation 706, the electronic device 106 may perform the at least one correlated action from among the set of pre-associated actions on the at least one IoT device, based on the correlation.

As would be gathered, the disclosure offers a comprehensive approach for performing the actions on IoT devices. The system 100 of the disclosure may track the user interactions in the environment subsequent to receipt of the voice input, if the system 100 fails to recognize the voice input received from the user. Subsequently, the system 100 may intelligently correlate each of the user interactions with the voice input. Based on the correlation, the system 100 may map the user interactions to the unrecognized voice input. Accordingly, if the user re-utterers such voice input, then the system 100 may perform the mapped user interactions in the environment. This substantially reduces the cognitive load on the user to remember predefined voice inputs, as the system 100 may intelligently perform associated user interactions corresponding to the past voice inputs. Further, in real-time, based on the user interactions, the system 100 may provide information for suggesting to the user, to control the at least one IoT device to perform the at least one pre-associated action upon completion of a current action being performed by the user. This substantially enhances overall user experience while interacting with the IoT devices 102. Therefore, the disclosure offers the system 100 and the methods 600, 700 that are comprehensive, accurate, intelligent, time-saving, convenient, and consistent.

Figure 8:
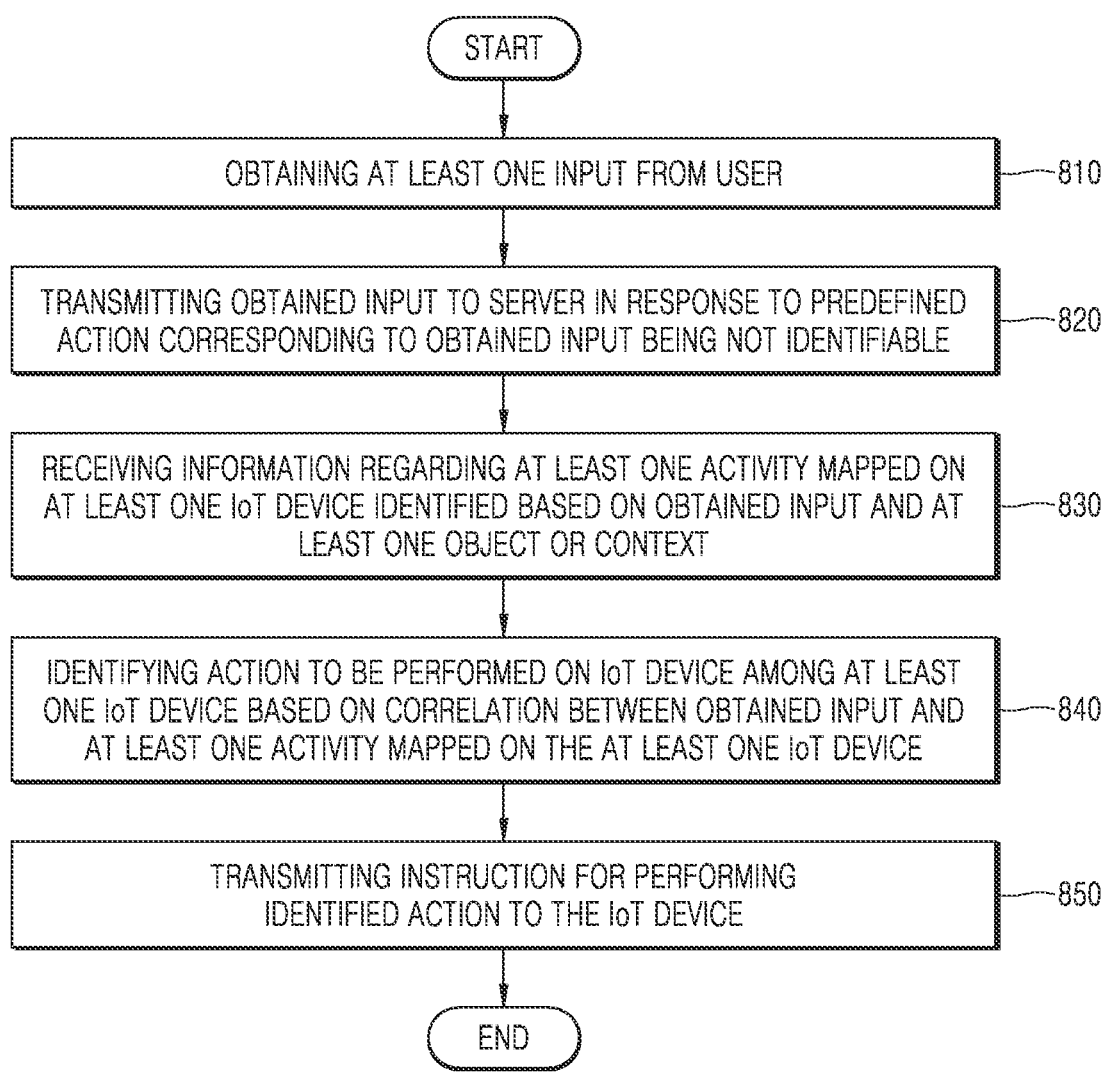
FIG. 8 is a flowchart for describing a method of controlling at least one IoT device based on at least one input received from a user, by an electronic device, according to an embodiment of the disclosure.

FIG. 8 is a flowchart for describing a method of controlling at least one IoT device based on at least one input received from a user, by an electronic device, according to an embodiment of the disclosure.

In operation 810, the electronic device may obtain at least one input from a user. For example, the electronic device may sense, via an audio sensor, voice input from the user. However, this is an example, the electronic device may sense, via an image sensor, gesture input from the user. In this embodiment, for convenience of description, the at least one input is described as the voice input.

In operation 820, the electronic device may transmit obtained input to a server, in response to a predefined action corresponding to the obtained input being not identifiable.

According to the obtained input, the electronic device may identify that whether the obtained input corresponds to the one of a plurality of predefined actions. In an embodiment, if the predefined action corresponding to the obtained input is not identifiable, the electronic device transmits the obtained input to the server for identifying the action corresponding to the obtained input.

In operation 830, the electronic device may receive information regarding at least one activity mapped on at least one IoT device identified based on the obtained input and at least one object of context. For example, the electronic device may receive probability information regarding at least one candidate action for the at least one activity mapped on the at least one IoT device. In this regard, the probability information may be obtained based on the obtained input and any one or any combination of the object or the context at the server. The any one or any combination of the object or the context is identified at the server based on the obtained input and characteristic information of the user.

In operation 840, the electronic device may identify an action to be performed on an IoT device among the at least one IoT device based on a correlation between the obtained input and the at least one activity mapped on the at least one IoT device.

In an embodiment, the electronic device may identify user actions performed subsequent to the at least one input. The electronic device may obtain similarity information indicating similarity between each of the user actions performed subsequent to the at least one input and the obtained input. For example, the electronic device may obtain similarity scores for the user actions performed subsequent to the at least one input. The electronic device may identify the action to be performed on the IoT device based on the probability information and the similarity information.

In operation 850, the electronic device may transmit an instruction for performing the identified action to the IoT device.

The electronic device may perform update of a database based on the identified action mapped to the obtained input. In this regard, the database may correspond to the aforementioned DATA 208-1. In response to another input corresponding to the obtained input being received after the update of the database, the electronic device may transmit the instruction for performing the identified action to the IoT device.

Figure 9:
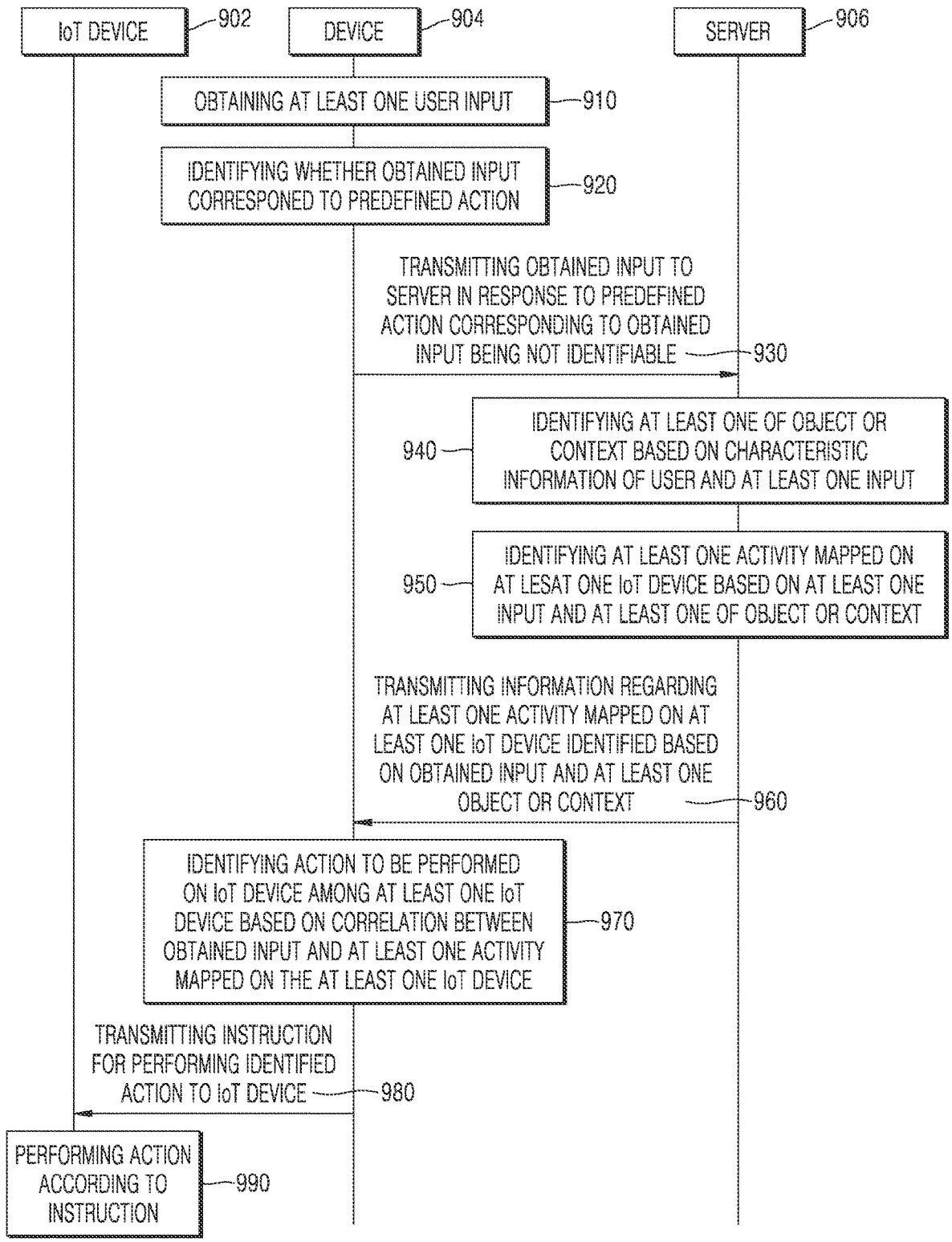
FIG. 9 is a flowchart for describing a method of controlling at least one IoT device based on at least one input received from a user, by an electronic device and a server, according to an embodiment of the disclosure.

FIG. 9 is a flowchart for describing a method of controlling at least one IoT 902 device based on at least one input received from a user, by an electronic device 904 and a server 906, according to an embodiment of the disclosure.

In operation 910, the electronic device 904 may obtain at least one input from a user.

In operation 920, the electronic device 904 may identify whether the obtained input corresponds to one of predefined actions.

In operation 930, the electronic device 904 may transmit the obtained input to the server 906, in response to the predefined action corresponding to the obtained input being not identifiable.

In operation 940, the server 906 may identify at least one of object or context based on characteristic information of the user and the at least one input.

The server 906 may receive the obtained input from the electronic device. In this case, the server may identify user identity based on an identifier of the electronic device. The server 906 may select the characteristic information including historical data regarding previous user actions and previous inputs from the user, based on the identifier of the electronic device.

In addition, the server 906 may enrich vocabularies associated with the voice command based on the identified objects or identified contexts. The enriched vocabularies are fed back for identifying object or context associated with the received input of the user. The server 906 may categorize the identified objects and identified contexts.

In operation 950, the server 906 may identify at least one activity mapped on at least one IoT device, based on the at least one input and the at least one of the object or the context.

The server 906 may identify the at least one IoT device from among a plurality of IoT devices based on the categorized objects and the categorized contexts. The server 906 may obtain probability information for the at least one IoT device. For example, the server 906 may assign the aforementioned probability score to the each of the at least one IoT device.

The server 906 may identify the at least one activity based on the identified IoT device, the categorized objects, the categorized contexts and the obtained input. The server 906 may obtain probability information for the at least one activity. For example, the server 906 may assign the aforementioned probability score to the each of the at least one activity.

The server 906 may correlate to each of the at least one IoT device and the at least one activity based on the assigned probability scores. In addition, the server 906 may determine candidate actions corresponding to each of the at least one activity mapped on the at least one IoT device. In an embodiment, the server 906 may determine probability information for each of the candidate actions. For example, the server 906 may determine probability score for each of the candidate actions.

In the operation 960, the server 906 may transmit information regarding the at least one activity mapped on the at least one IoT device identified based on the obtained input and the at least one of the object or the context.

In operation 970, the electronic device 904 may identify action to be performed on an IoT device among the at least one IoT device based on a correlation between the obtained input and the at least one activity mapped on the at least one IoT device.

In operation 980, the electronic device 904 may transmit an instruction for performing the identified action to the IoT device 902.

In operation 990, the IoT device 902 from among the at least one IoT devices, may perform the identified action according to the instruction.

Figure 10:
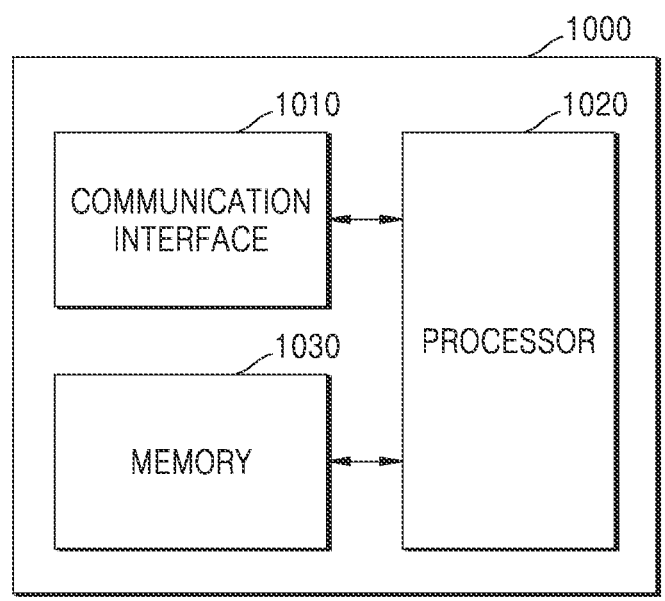
FIG. 10 is a block diagram illustrating an electronic device according to an embodiment of the disclosure.

FIG. 10 is a block diagram illustrating an electronic device 1000 according to an embodiment of the disclosure.

Referring to the FIG. 10, the electronic device 1000 may include a communication interface 1010, a processor 1020 and a memory 1030. However, all of the illustrated components are not essential. The electronic device 1000 may be implemented by more or less components than those illustrated in FIG. 10. In addition, the communication interface 1010, the processor 1020 and the memory 1030 may be implemented as a single chip according to another embodiment.

The aforementioned components will now be described in detail.

The communication interface 1010 may include one or more elements for communicating with an external apparatus. For example, the communication interface 1010 may include a short-range wireless communicator and a mobile communicator communicate with an external apparatus.

According to an embodiment, the communication interface 1010 may transmit at least one input of a user to a server. In addition, the communication interface 1010 may receive probability information regarding at least one activity mapped on at least one IoT device from the server.

The processor 1020 controls all operations of the electronic device 1000 and a signal flow between the internal elements of the electronic device 1000 and performs a function of controlling at least one IoT device to perform at least one action. The processor 1020 may include one or more processors or other processing devices that control the proposed function, process, and/or method. Operations of the electronic device 1000 may be implemented by the processor 1020.

According to an embodiment, the processor 1020 may obtain at least one input from the user. In response to a predefined action corresponding to the obtained input being not identifiable, the processor 1020 may transmit, via the communication interface 1010, the obtained input to the server. The processor 1020 may receive, via the communication interface 1010, information regarding at least one activity mapped on at least one IoT device identified based on the obtained input and at least one object or context. In this regard, any one or any combination of the object or the context is identified at the server based on the obtained input and characteristic information of the user. The processor 1020 may identify an action to be performed on an IoT device among at least one IoT device, based on a correlation between the obtained input and the at least one activity mapped on the at least one IoT device. The processor 1020 may transmit, via the communication interface 1010, an instruction for performing the identified action, to the IoT device.

The operations implemented by the processor 1020 corresponds to the operations of the electronic device described with reference to FIGS. 1 to 9, thus a detailed description thereof may be omitted below.

The memory 1030 may store the at least one input and information regarding the identified action. The memory 1030 may be connected to the processor 1020 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices.

Figure 11:
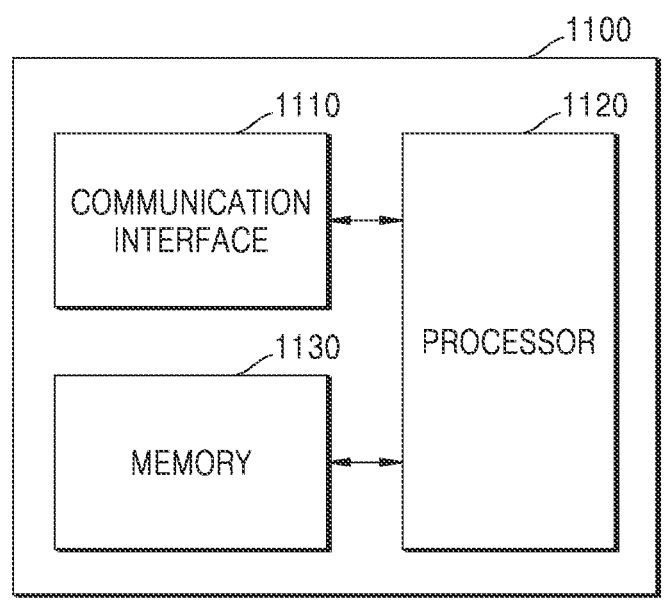
FIG. 11 is a block diagram illustrating a server device according to an embodiment of the disclosure.

FIG. 11 is a block diagram illustrating a server 1100 device according to an embodiment of the disclosure.

Referring to the FIG. 11, the server 1100 may include a communication interface 1110, a processor 1120 and a memory 1130. However, all of the illustrated components are not essential. The server 1100 may be implemented by more or less components than those illustrated in FIG. 11. In addition, the communication interface 1110, the processor 1120 and the memory 1130 may be implemented as a single chip according to another embodiment.

The aforementioned components will now be described in detail.

The communication interface 1110 may include one or more elements for communicating with an external apparatus. For example, the communication interface 1110 may include a short-range wireless communicator and a mobile communicator communicate with an external apparatus.

According to an embodiment, the communication interface 1110 may receive at least one input of a user from an electronic device. In addition, the communication interface 1110 may transmit probability information regarding at least one activity mapped on at least one IoT device to the electronic device.

The processor 1120 controls all operations of the server 1100 and a signal flow between the internal elements of the server 1100 and performs a function of controlling at least one IoT device to perform at least one action. The processor 1120 may include one or more processors or other processing devices that control the proposed function, process, and/or method. Operations of the server 1100 may be implemented by the processor 1120.

According to an embodiment, the processor 1120 may receive, via the communication interface 1110, receive at least one input of the user from the electronic device, in response to a predefined action corresponding to the obtained input being not identifiable at the electronic device.

The processor 1120 may identify any one or any combination of object or context based on characteristic information of the user and the at least one input. The processor 1120 may identify at least one activity mapped on at least one IoT device based on the at least one input and any one or any combination of the object or the context. The processor 1120 may transmit, via the communication interface 1110, regarding the at least one activity mapped on the at least one device.

The operations implemented by the processor 1120 corresponds to the operations of the electronic device described with reference to FIGS. 1 to 9, thus a detailed description thereof may be omitted below.

The memory 1130 may store the at least one input and information regarding the identified action. The memory 1130 may be connected to the processor 1120 and store at least one instruction or a protocol or a parameter for the proposed function, process, and/or method. The memory 1130 may include read-only memory (ROM) and/or random access memory (RAM) and/or hard disk and/or CD-ROM and/or DVD and/or other storage devices.

While language has been used to describe the disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, elements may be split into multiple functional elements. Elements from one embodiment may be added to another embodiment.

The embodiments of the disclosure may be written as programs executable on a computer, and may be implemented in general-use digital computers that execute the programs using a computer-readable recording medium. Examples of the computer-readable recording medium include storage media such as magnetic storage media (e.g., ROM, floppy disks, hard disks, etc.), optical recording media (e.g., CD-ROMs or DVDs), and carrier waves (e.g., transmission through the Internet).

While embodiments of the disclosure have been described with reference to the figures, those of ordinary skill in the art will appreciate that the disclosure may be implemented in other forms without departing from the technical spirit or characteristics thereof. It is therefore to be understood that the above-described embodiments of the disclosure are illustrative in all aspects and not restrictive.

What is claimed is:

1. A method of controlling an Internet of Things (IoT) device, by an electronic device, the method comprising:
   obtaining a user input;
   in case that a predefined action corresponding to the user input is not identifiable from a database of the electronic device, obtaining first information regarding a first action performed on a first IoT device, and transmitting the user input to a server, wherein the first action is performed subsequent to the obtaining of the user input;
   receiving, from the server, second information regarding a second action to be performed on a second IoT device, based on the transmitted user input;
   based on the first information and the second information, identifying an action to be performed and an IoT device on which the identified action is to be performed, among a plurality of IoT devices including the first IoT device and the second IoT device; and
   updating the database of the electronic device, based on the user input, the identified action and the identified IoT device.

2. The method of claim 1, wherein the second information regarding the second action indicates a likelihood that the second action is to be operated with respect to user input.

3. The method of claim 1,
   wherein the first information regarding the first action indicates a similarity between the first action and the user input.

4. The method of claim 1, wherein the obtaining of the first information comprises:
   classifying the first action into a category among a plurality of categories, based on the user input; and
   obtaining, based on the category in which the first action is classified, a similarity score for the first action, as similarity information.

5. The method of claim 1, wherein the second action is mapped to the second IoT device, based on one or combination of a plurality of pre-trained regression functions, at the server.

6. The method of claim 1, further comprising:
   based on receiving another user input corresponding to the user input, after the database is updated, transmitting an instruction for performing the identified action, to the identified IoT device.

7. An electronic device for controlling an Internet of Things (IoT) device, the electronic device comprising:
   a memory storing one or more instructions;
   a communication interface; and
   a processor configured to execute the one or more instructions stored in the memory to:
      obtain a user input,
      in case that a predefined action corresponding to the user input is not identifiable from a database of the electronic device, obtain first information regarding a first action performed on a first IoT device, and transmit, via the communication interface, the user input to a server, wherein the first action is performed subsequent to the obtaining of the user input,
      receive, from the server via the communication interface, second information regarding a second action to be performed on a second IoT device, based on the transmitted user input,
      based on the first information and the second information, identify an action to be performed and an IoT device on which the identified action is to be performed, among a plurality of IoT devices including the first IoT device and the second IoT device, and
      update the database of the electronic device, based on the user input, the identified action and the identified IoT device.

8. The electronic device of claim 7, wherein the second information regarding the second action indicates a likelihood that the second action is to be operated with respect to the user input.

9. The electronic device of claim 8, wherein the first information regarding the first action indicates a similarity between the first action and the user input.

10. The electronic device of claim 9, wherein the processor is further configured to:
    classify the first action into a category among a plurality of categories, based on the user input, and
    obtain, based on the category in which the first action is classified, a similarity score for the first action, as similarity information.

11. The electronic device of claim 7, wherein the second action is mapped to the second IoT device, based on one or combination of a plurality of pre-trained regression functions, at the server.

12. The electronic device of claim 7, wherein the processor is further configured to:
based on receiving another user input corresponding to the user input, after the database is updated, transmit, via the communication interface, an instruction for performing the identified action, to the identified IoT device.

13. A server for controlling an Internet of Things (IoT) device, the server comprising:
a memory storing one or more instructions;
a communication interface; and
a processor configured to execute the one or more instructions stored in the memory to:
receive, from an electronic device via the communication interface, a user input, in case that a predefined action corresponding to the user input is not identifiable from a database of the electronic device, wherein first information regarding a first action performed on a first IoT device is obtained at the electronic device and the first action is performed subsequent to the user input being obtained at the electronic device,
identify a second action to be performed on a second IoT device, based the received user input, and
transmit, to the electronic device via the communication interface, second information regarding the second action to be performed on the second IoT device,
wherein an action to be performed and an IoT device on which the identified action is to be performed, among a plurality of IoT devices including the first IoT device and the second IoT device is identified at the electronic device, based on the first information and the second information, and
wherein the database of the electronic device is updated based on the user input, the identified action and the identified IoT device.

14. The server of claim 13, wherein the second information regarding the second action indicates a likelihood that the second action is to be operated with respect to the user input.

15. The server of claim 14, wherein
the action to be performed on the IoT device among the at least one IoT device is identified at the electronic device, based on the probability information and similarity information indicating a similarity between each of one or more user actions and the user input.

16. The server of claim 13, wherein the first information regarding the first action indicates a similarity between the first action and the user input.

17. The server of claim 13, wherein the processor is further configured to map the second action to the second IoT device, based on one or a combination of a plurality of pretrained regression functions.

* * * * *